US012235223B2

(12) United States Patent
Kondo et al.

(10) Patent No.: US 12,235,223 B2
(45) Date of Patent: Feb. 25, 2025

(54) METHOD FOR DEFECT INSPECTION, SYSTEM, AND COMPUTER-READABLE MEDIUM

(71) Applicant: Hitachi High-Tech Corporation, Tokyo (JP)

(72) Inventors: Takanori Kondo, Tokyo (JP); Nobuhiro Obara, Tokyo (JP); Takahiro Urano, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 157 days.

(21) Appl. No.: 17/925,624

(22) PCT Filed: Jun. 12, 2020

(86) PCT No.: PCT/JP2020/023173
§ 371 (c)(1),
(2) Date: Nov. 16, 2022

(87) PCT Pub. No.: WO2021/250884
PCT Pub. Date: Dec. 16, 2021

(65) Prior Publication Data
US 2023/0175981 A1 Jun. 8, 2023

(51) Int. Cl.
*G01N 21/95* (2006.01)
*G01N 21/47* (2006.01)
*G01N 21/88* (2006.01)

(52) U.S. Cl.
CPC ......... *G01N 21/9501* (2013.01); *G01N 21/47* (2013.01); *G01N 2021/8854* (2013.01);
(Continued)

(58) Field of Classification Search
CPC .... G01N 21/47; G01N 21/88; G01N 21/8803; G01N 21/8806; G01N 21/8851;
(Continued)

(56) References Cited

U.S. PATENT DOCUMENTS 8,908,172 B2 * 12/2014 Urano ................ G01N 21/9501
356/237.5
9,601,393 B2 * 3/2017 Lee ........................ H01L 22/12
(Continued)

FOREIGN PATENT DOCUMENTS

JP 2008-82821 A 4/2008
JP 2011-163855 A 8/2011
(Continued)

OTHER PUBLICATIONS

International Search Report (PCT/ISA/210) issued in PCT Application No. PCT/JP2020/023173 dated Sep. 15, 2020 with English translation (seven (7) pages).
(Continued)

*Primary Examiner* — Gordon J Stock, Jr.
(74) *Attorney, Agent, or Firm* — Crowell & Moring LLP

(57) ABSTRACT

The present disclosure proposes a method for classifying defects and the like by using a learning device that has been suitably trained, a system, and a computer-readable medium. As one aspect thereof, the present disclosure proposes (see FIG. 1) a defect inspection method, etc., in which one or more computers are used to inspect a defect on a sample on the basis of output information from detectors that detect scattered light produced via the irradiation of the sample with light, wherein defect information is outputted by: receiving output from a plurality of detectors disposed at a plurality of angles of elevation with reference to the sample surface, and at a plurality of sample surface-direction orientations with reference to the irradiation points of the light on the sample; and inputting the output information of the plurality of detectors into a learning device that has been trained using the output information from the plurality of detectors and the defect information.

7 Claims, 17 Drawing Sheets

(52) U.S. Cl.
CPC .............. *G01N 2021/888* (2013.01); *G01N 2021/8883* (2013.01)

(58) Field of Classification Search
CPC ........... G01N 21/9501; G01N 21/9503; G01N 21/9505; G01N 2021/8854; G01N 2021/8858; G01N 2021/8861; G01N 2021/8864; G01N 2021/8867; G01N 2021/887; G01N 2021/8874; G01N 2021/8877; G01N 2021/888; G01N 2021/8883; G01N 2021/8887; G03F 7/70605; G03F 7/70616; G03F 7/7065; G03F 7/70653; G03F 7/70681; G03F 7/706835; G03F 7/706837; G03F 7/706839; G03F 7/706841; G03F 7/706843; G03F 7/706851
See application file for complete search history.

(56) References Cited

U.S. PATENT DOCUMENTS

| | | | | |
|---|---|---|---|---|
| 9,823,065 | B2* | 11/2017 | Kondo | G01B 11/303 |
| 10,228,332 | B2 | 3/2019 | Honda et al. | |
| 10,755,396 | B2* | 8/2020 | Enyama | H01J 37/28 |
| 2008/0075352 | A1 | 3/2008 | Shibuya et al. | |
| 2008/0075353 | A1* | 3/2008 | Tek | G01N 21/9501 |
| | | | | 382/145 |
| 2009/0299681 | A1* | 12/2009 | Chen | G01N 21/9501 |
| | | | | 702/123 |
| 2012/0229618 | A1* | 9/2012 | Urano | G06T 7/0004 |
| | | | | 348/92 |
| 2012/0293795 | A1 | 11/2012 | Urano et al. | |
| 2012/0294507 | A1 | 11/2012 | Sakai et al. | |
| 2013/0077092 | A1 | 3/2013 | Sasazawa et al. | |
| 2016/0358041 | A1 | 12/2016 | Venkataraman et al. | |
| 2017/0146463 | A1 | 5/2017 | Honda et al. | |
| 2017/0194126 | A1 | 7/2017 | Bhaskar et al. | |
| 2018/0157933 | A1 | 6/2018 | Brauer et al. | |
| 2019/0073566 | A1 | 3/2019 | Brauer | |
| 2019/0073568 | A1 | 3/2019 | He et al. | |
| 2019/0294923 | A1 | 9/2019 | Riley et al. | |
| 2019/0303717 | A1 | 10/2019 | Bhaskar et al. | |
| 2019/0370955 | A1 | 12/2019 | Zhang et al. | |
| 2023/0175979 | A1* | 6/2023 | Honda | G01N 21/8806 |
| | | | | 356/446 |
| 2023/0175982 | A1* | 6/2023 | Honda | G01N 21/8851 |
| | | | | 356/446 |

FOREIGN PATENT DOCUMENTS

| | | | | | |
|---|---|---|---|---|---|
| JP | 2011-179823 | A | | 9/2011 | |
| JP | 2013-72788 | A | | 4/2013 | |
| JP | 2015-197320 | A | | 11/2015 | |
| JP | 6328468 | B2 | | 5/2018 | |
| JP | 2018-524804 | A | | 8/2018 | |
| JP | 2019-508678 | A | | 3/2019 | |
| JP | 2020-500422 | A | | 1/2020 | |
| JP | 2020-501154 | A | | 1/2020 | |
| WO | WO-2005024404 | A1 | * | 3/2005 | ......... G01N 21/8806 |

OTHER PUBLICATIONS

Japanese-language Written Opinion (PCT/ISA/237) issued in PCT Application No. PCT/JP2020/023173 dated Sep. 15, 2020 (four (4) pages).

* cited by examiner

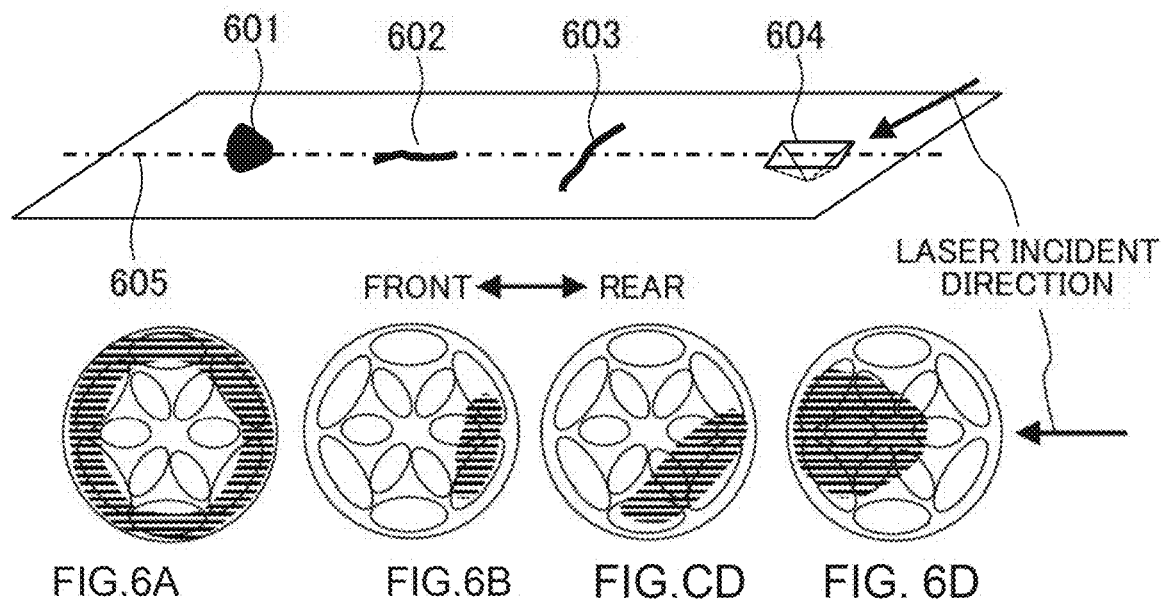
FIG.6A  FIG.6B  FIG.CD  FIG. 6D
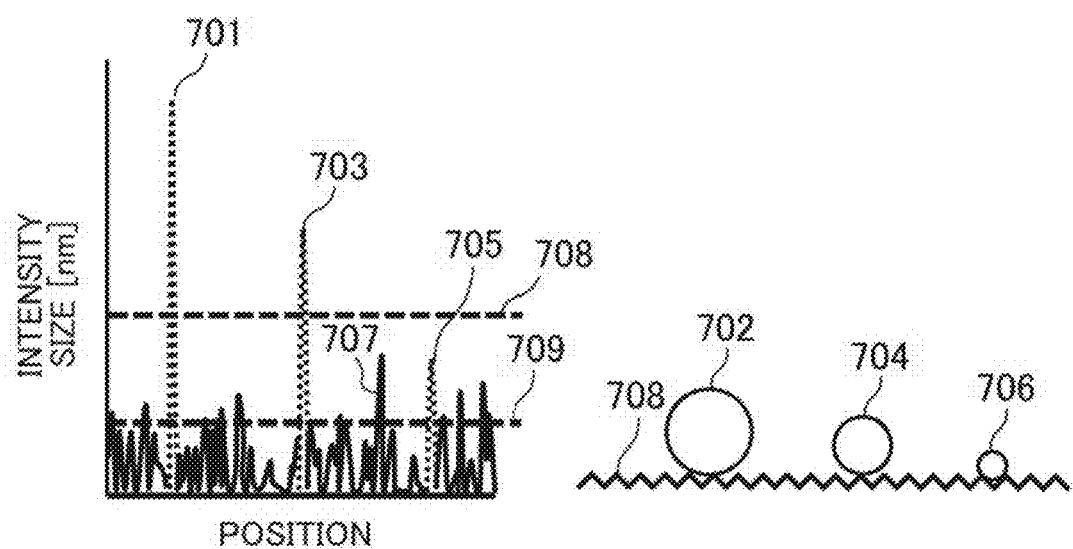
FIG. 7

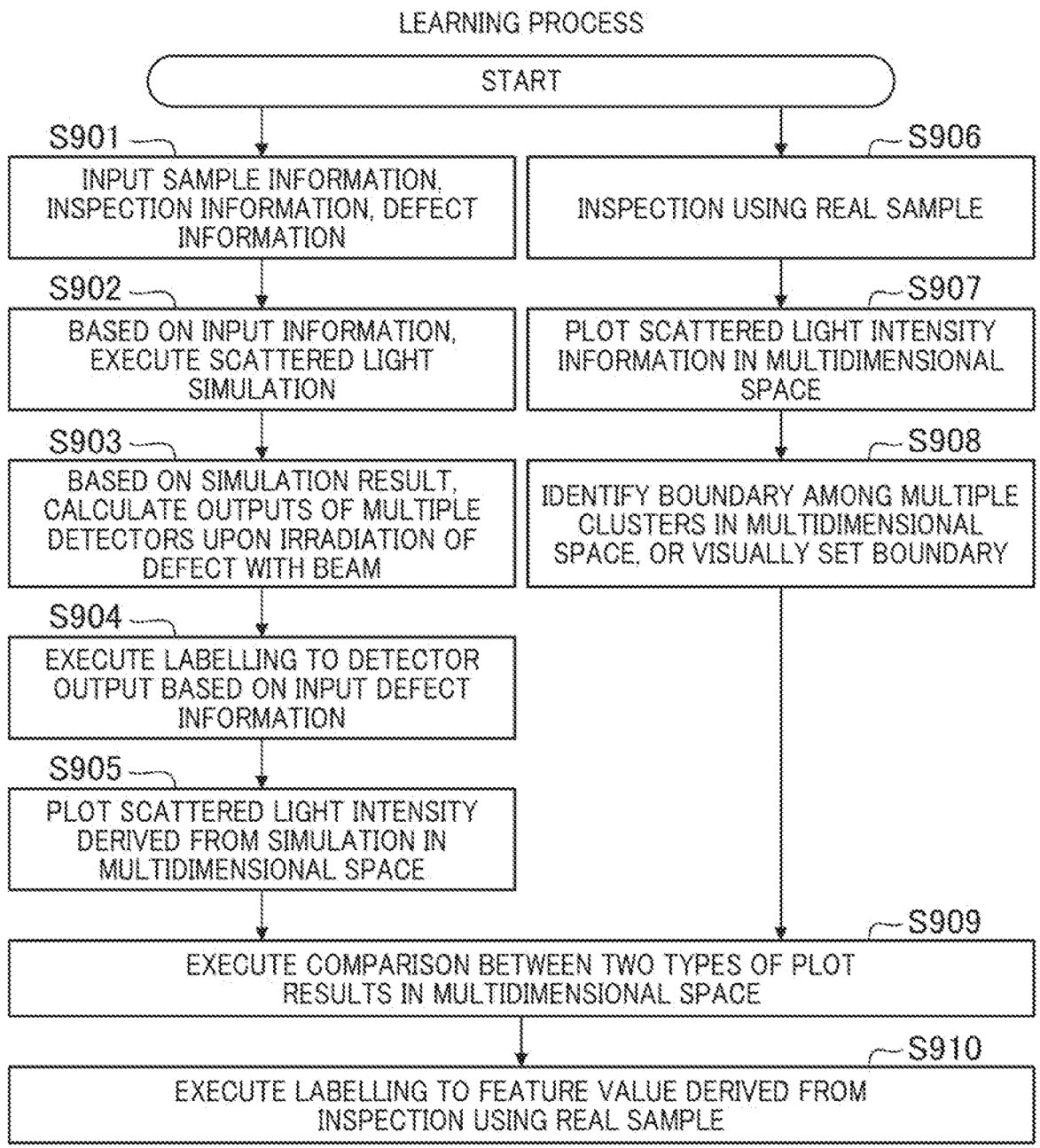

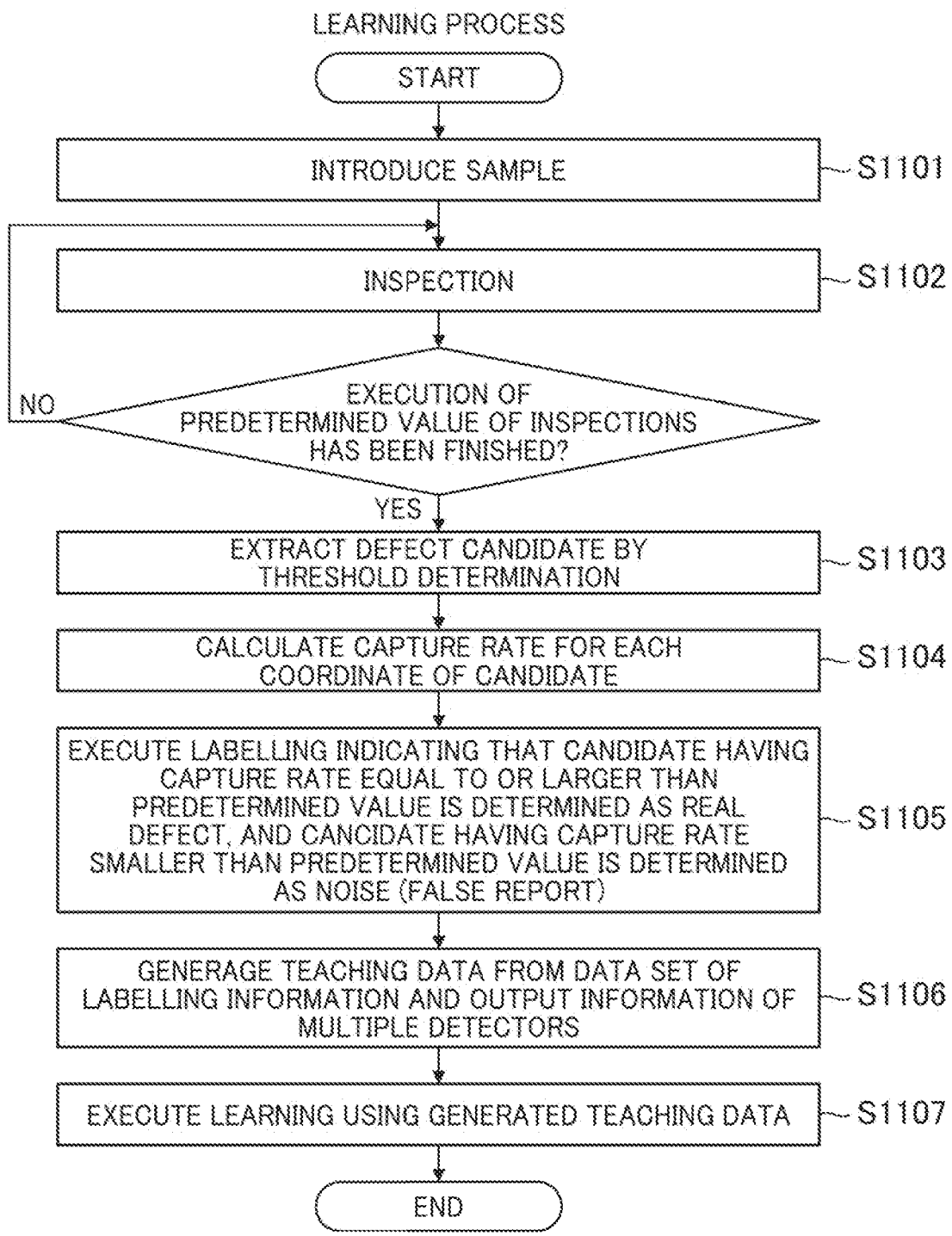

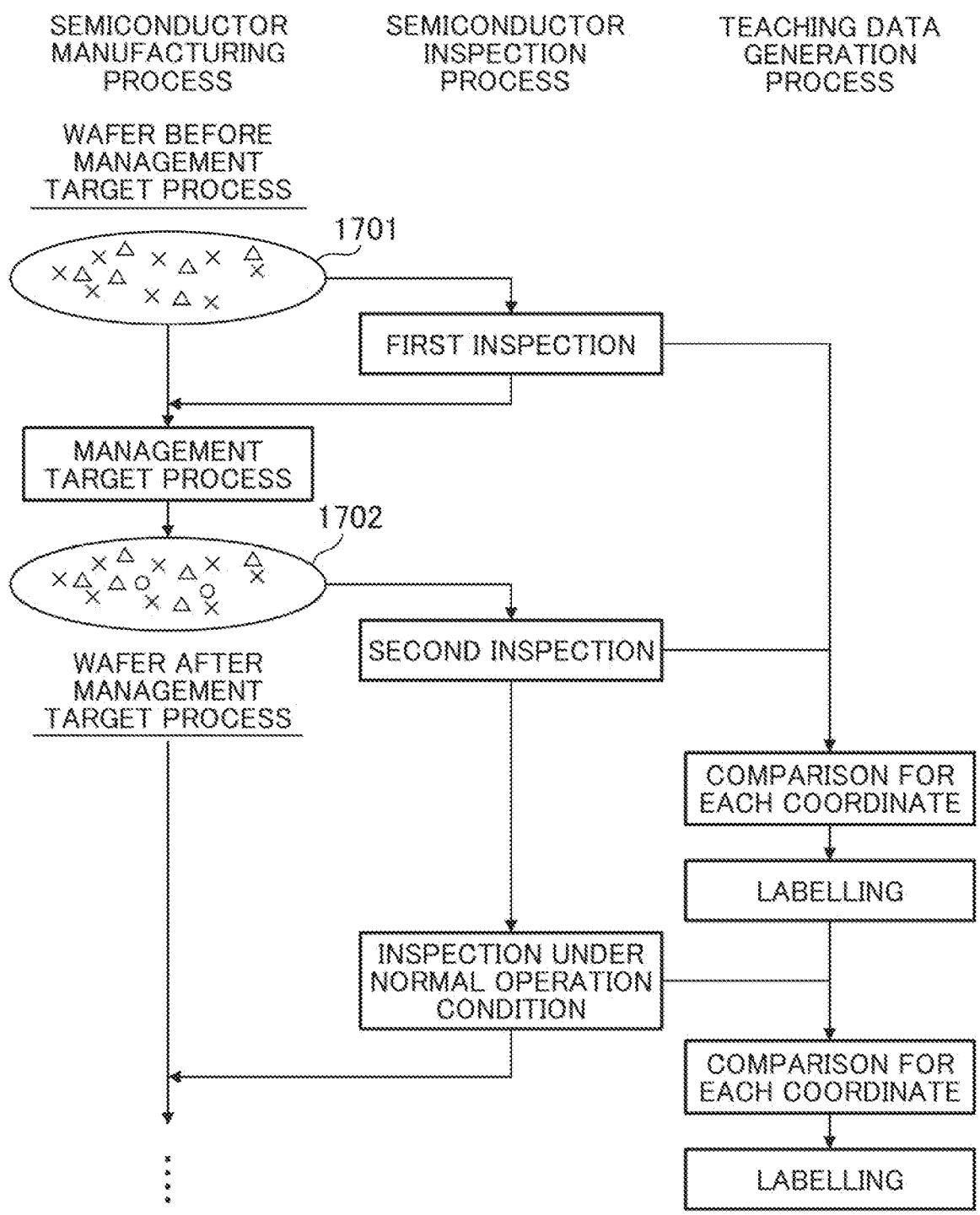

METHOD FOR DEFECT INSPECTION, SYSTEM, AND COMPUTER-READABLE MEDIUM

TECHNICAL FIELD

The present disclosure relates to a method which allows classification of defect type such as a particle and a scratch adhered onto a sample like a semiconductor wafer, or classification of defects into a defect of interest (DOI), and other defects or noise (Nuisance). The disclosure further relates to a method and a system for classification, and a computer-readable medium.

BACKGROUND ART

Defects existing on surfaces of semiconductor substrates and thin film substrates are inspected on a line for manufacturing the semiconductor substrates and the thin film substrates for the purpose of maintaining and improving the product yield. Patent Literature 1 discloses the defect inspection apparatus provided with multiple detectors each having a different relative angle to the normal vector on the substrate surface.

CITATION LIST

Patent Literature

Patent Literature 1: U.S. Pat. No. 6,328,468 (corresponding to U.S. Pat. No. 10,228,332)

SUMMARY OF INVENTION

Technical Problem

The inspection apparatus provided with multiple detectors as disclosed in Patent Literature 1 allows highly efficient detection of the multidirectionally scattering light. Meanwhile, the inventors have examined application of the artificial intelligence as the tool for classification of defects or the like for the purpose of classifying the defect with high accuracy. Appropriate training has to be executed for applying the artificial intelligence as the appropriate classifier. Patent Literature 1 does not disclose the method for training the classifier.

The present disclosure proposes the method and the system for defect inspection, aiming at defect classification using an appropriately trained learning device, and a computer-readable medium.

Solution to Problem

According to an aspect to attain the object, the disclosure proposes a defect inspection method for inspecting a defect on a sample based on output information of a detector for detecting a scattered light generated by irradiation of the sample with a light, using one or more computers. The defect inspection method includes the steps of receiving outputs of multiple detectors arranged at multiple elevation angles to a surface of the sample, and in multiple azimuths to an irradiation point of the light on the sample in a direction to the surface of the sample, and inputting the output information of the multiple detectors to a learning device trained using the output information of the multiple detectors and defect information for outputting the defect information.

According to another aspect to attain the object, the disclosure proposes a system which includes an inspection tool composed of multiple detectors for detecting a scattered light generated by irradiation of a sample with a light. The multiple detectors are arranged at multiple elevation angles to a surface of the sample, and in multiple azimuths to an irradiation point of the light on the sample in a direction to the surface of the sample. The system further includes a computer allowed to execute a program stored in a computer-readable storage medium for processing output information of the multiple detectors. The computer receives the output information of the multiple detectors, and inputs the output information of the multiple detectors to a learning device trained using the output information of the multiple detectors and defect information for outputting the defect information.

The disclosure further proposes a non-temporal computer-readable medium configured to store an instruction of a program executable by a computer for processing output information of a detector for detecting a scattered light generated by irradiation of a sample with a light. The non-temporal computer-readable medium receives outputs of multiple detectors arranged at multiple elevation angles to a surface of the sample, and in multiple azimuths to an irradiation point of the light on the sample in a direction to the surface of the sample, and inputs the output information of the multiple detectors to a learning device trained using the output information of the multiple detectors and defect information for outputting the defect information.

Advantageous Effects of Invention

The above-described configuration allows execution of the defect classification using the appropriately trained learning device.

BRIEF DESCRIPTION OF DRAWINGS

FIGS. 6A to 6D illustrate a scattered light distribution for each defect type.

FIG. 7 illustrates a relationship between a defect size and a detection signal.

FIG. 9 is a flowchart representing a process for executing labelling based on a comparison between a simulation result derived from a scattered light simulation and an inspection result using a real sample.

FIG. 11 is a flowchart representing a process for training a learning device using learning data derived from an inspection executed multiple times.

FIG. 17 is a flowchart representing a process for labeling to train the learning device based on information acquired before and after execution of the semiconductor manufacturing process.

DESCRIPTION OF EMBODIMENT

Hereinafter, explanations will be made about a classification method which allows classification of defect types such as a particle and a scratch, adhered onto a sample like a semiconductor wafer or classification of defects into a defect of interest (DOI), and other defects or noise. The disclosure further relates to a system for classification, and a computer-readable medium.

<Structure Example of Inspection Apparatus>

FIG. 1 illustrates an example of an inspection apparatus (inspection tool) for detecting a defect formed on a sample. The inspection apparatus illustrated in FIG. 1 is an optical inspection apparatus which includes a laser beam light source, and allows multiple detectors to detect a reflected light generated upon irradiation of the sample with the laser beam.

Figure 1A:
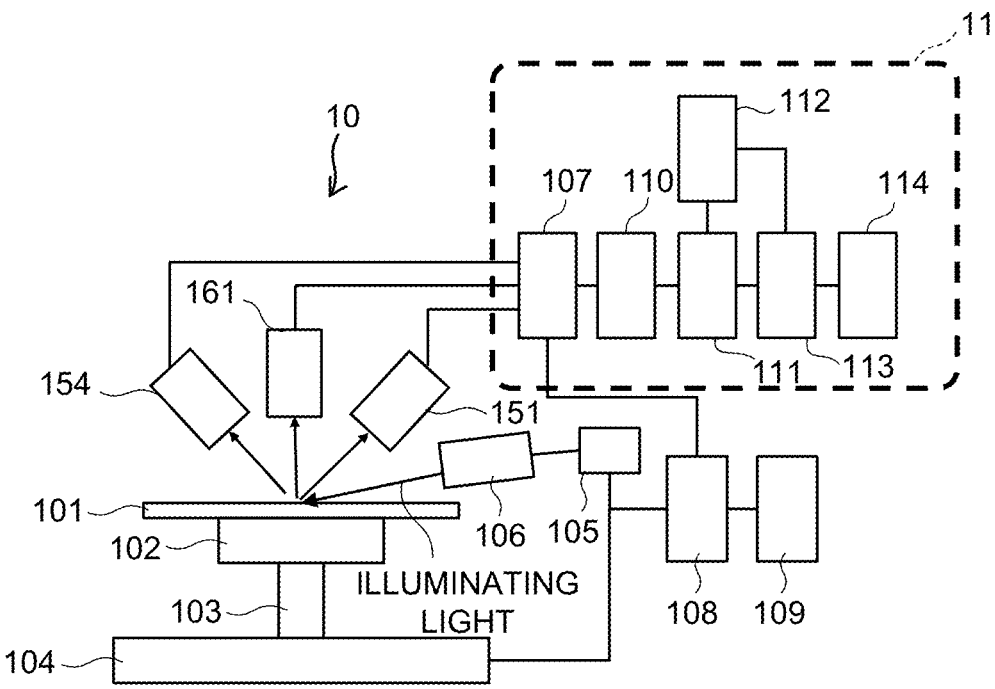
FIGS. 1A and 1B schematically illustrates an optical inspection apparatus.
Figure 1B:
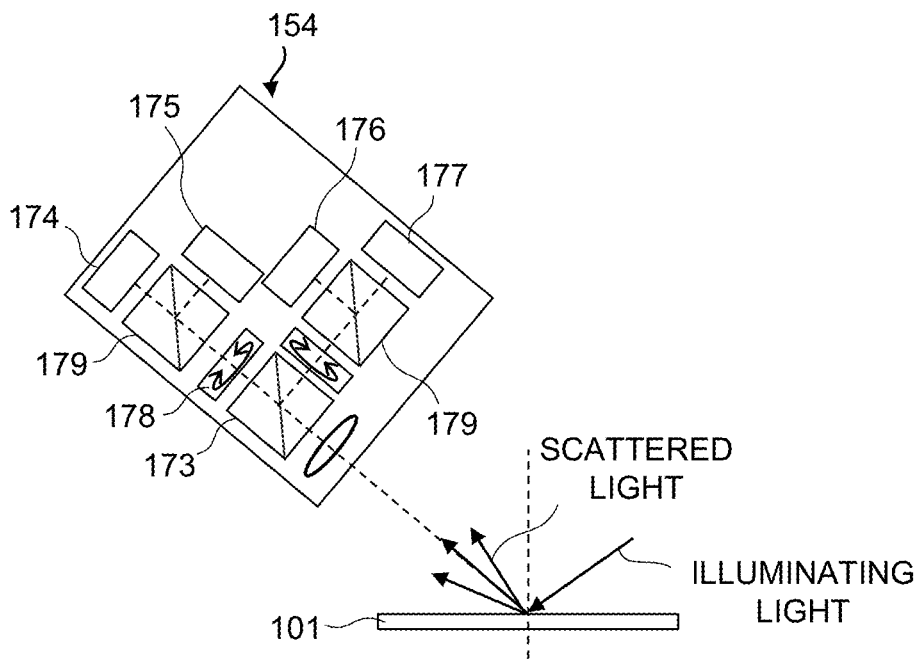

FIG. 1A schematically illustrates a structure of an inspection apparatus 10. FIG. 1B illustrates a structure of a detection system for detecting a scattered light from a wafer. As illustrated in FIG. 1A, the inspection apparatus 10 according to an embodiment includes, for example, a chuck 102 which adsorbs a wafer 101, a rotary stage 103 provided with the chuck 102, a direct advancing stage 104 on which the rotary stage 103 is mounted, a light source 105, an illumination optical system 106 having a lens, a mirror, and the like, detection systems (detectors) 151, 154, 161 each having a lens and a mirror, a signal processing system 11, a control section 108, and an operation system 109.

The signal processing system 11 (for example, one or more computer systems) is configured to execute threshold determination with respect to signal intensity of a detector output. The system is further configured to identify the defect type based on a plurality of set thresholds. The signal processing system 11 includes an A/D conversion section 107, a signal processing section 110, a comparative computing section 111, an external input section 112, a data processing section 113, and a display section 114. The signal processing section 110 serves as a signal separator for separating a signal indicating the defect, the particle or the like as described later from a HAZE (reflected light (background light) caused by the sample surface roughness) signal. The data processing section 113 includes a learning device to be described later, and one or more computer systems for training the learning device. For example, a neural network, a regression tree, a Bayesian classifier, and the like may be used as the learning device.

Information to be input to an input section 115 may be input to the operation system 109 by an operator together with a recipe condition. A wafer identifier ID and a process state are displayed on an inspection result screen or expressed as recipe information. A table for converting the wafer identifier ID into an individual object and the process state allows the wafer identifier ID to contain the process state.

The signal processing section 110 may be configured to include an amplifier for amplifying outputs of multiple detectors, and a computation unit for addition or subtraction of outputs of multiple detectors.

The detection system 154 as illustrated in FIG. 1B includes a BS 173 (Beam Splitter) for splitting a light, two units of PBS 179 (Polarizing Beam Splitter) for further splitting the light which has been splitted by the BS 173, and four sensors (a first sensor 174, a second sensor 175, a third sensor 176, a fourth sensor 177) each detecting the quarterly split light. The BS and the PBS are configured to be removably arranged on the respective optical paths. They are configured to be loadable into or unloadable from the optical paths by means of a not shown moving mechanism. A half-wave plate 178 is placed between the BS and the PBS. A polarization component to be detected by the two sensors can be changed by setting the respective angles of the plates. As the BS and the PBS allow the light to be split into multiple splits which are detected by multiple sensors, accuracy in classification of the particles and defects may be improved as described later.

Figure 2A:
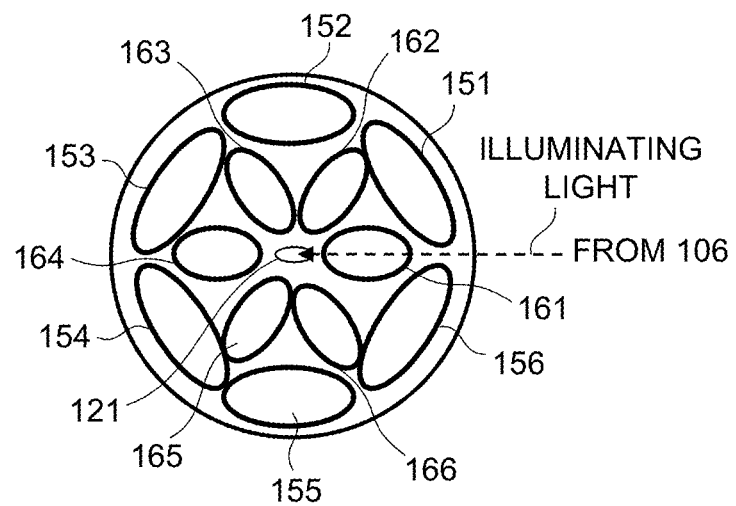
FIGS. 2A and 2B are an explanatory view representing a relationship of a beam irradiation direction with a detection system arrangement and a sample moving direction.

The inspection apparatus as illustrated in FIG. 1A includes a sample chamber (not shown) having a sphere-like (dome) ceiling on which multiple detection systems are provided. FIG. 2A is a top view illustrating positions of the detection systems provided on a semi-spherical ceiling. The multiple detection systems illustrated in FIG. 2A include low-angle (low elevation angle) detection systems 151 to 156 (L1 to L6), and high-angle (high elevation angle) detection systems 161 to 166 (H1 to H6). In an example to be described later, the defect or the particle is classified based on outputs of multiple detection systems placed at least at two elevation angles and at least at two azimuth angles.

<Specific Structure Example of Detection System>

Referring to FIG. 2A, the detection systems 151 to 156, and 161 to 166 are described more specifically. The illuminating light emitted from the illumination optical system 106 is focused to form a beam spot 121 on a surface of the wafer 101. The scattered light generated from the beam spot 121 is detected by the multiple detection systems 151 to 156, and 161 to 166. The detection systems 151 to 156, and 161 to 166 are disposed to detect lights each at the different elevation angle, and are disposed at the respective azimuth angles to detect lights directed to different azimuth angles at the respective elevation angles.

The illuminating light is supplied diagonally to the wafer 101 so that the detection systems 151 to 156, and 161 to 166 detect the scattered lights. The inspection apparatus 10 of the embodiment may be referred to as a so-called dark field type device. Each aperture of the detection systems 151 to 156, and 161 to 166 is illustrated as a substantially circular shape when the wafer 101 is seen from its normal direction. However, this applies to the polygonal shape.

FIG. 1B illustrates a structure example of one of the detection systems (for example, detection system 151), which are similar to one another. Explanations of other detection systems, thus will be omitted.

The detection system as illustrated in FIG. 1B is applicable not only to the detection system 154, but also to other detection systems. The detection system includes a sensor and a detection optical system for guiding the light to the sensor. The sensor is structured to include a photoelectric conversion element, for example. The illuminating light irradiated to the wafer 101 generates the beam spot 121 thereon. The light is scattered at the respective elevation angles and azimuth angles from the beam spot 121.

The scattered light is focused by the detection optical system with a prescribed numerical aperture. The detection optical system includes multiple lenses (lens group), and constitutes a light condensing optical system or an image forming optical system. The focused scattered light has its undesirable light shielded by a space filter and a polarizing filter, and is photoelectrically converted by the photoelectric conversion element. The photoelectrically converted signal obtained as the current or voltage is AD converted by the A/D conversion section 107, and processed by the signal processing section 110. The photoelectric conversion element may be exemplified as the photomultiplier, the Avalanche photo diode array, and the multipixel photon counter.

<Beam Spot Scanning Method>

Figure 2B:
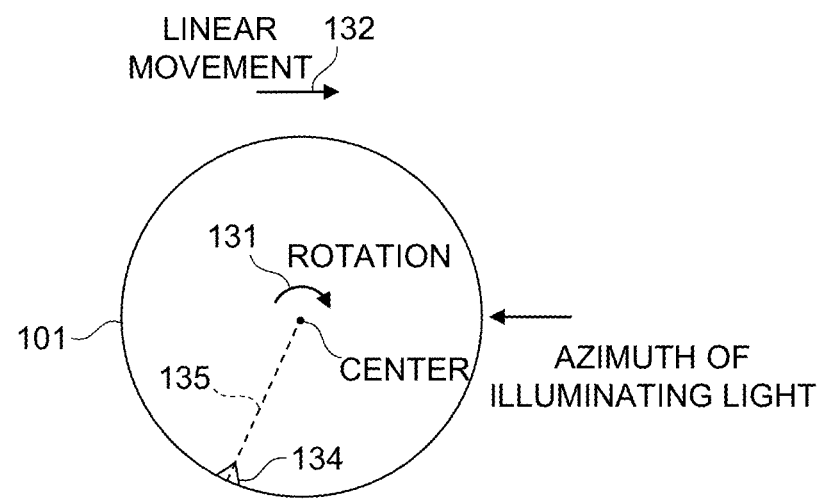

FIG. 2B is an explanatory view of a method for scanning the beam spot 121. The wafer 101 is rotated by the rotary stage 103 as indicated by an arrow 131 while being moved straightforwardly by the direct advancing stage 104 toward a direction indicated by an arrow 132. The beam spot 121 is scanned over an entire surface of the wafer 101 through the straightforward and rotating movements, resulting in concentric or spiral scan trajectory. The coordinate of the beam spot 121 can be managed based on the distance from the center and a rotation angle (that is, polar coordinate system). The rotation angle can be expressed on the basis of a virtual reference line 135 on the wafer (for example, a half-line passing a notch 134 and the center of the wafer).

<Configuration Example of Signal Processing System>

Figure 3:
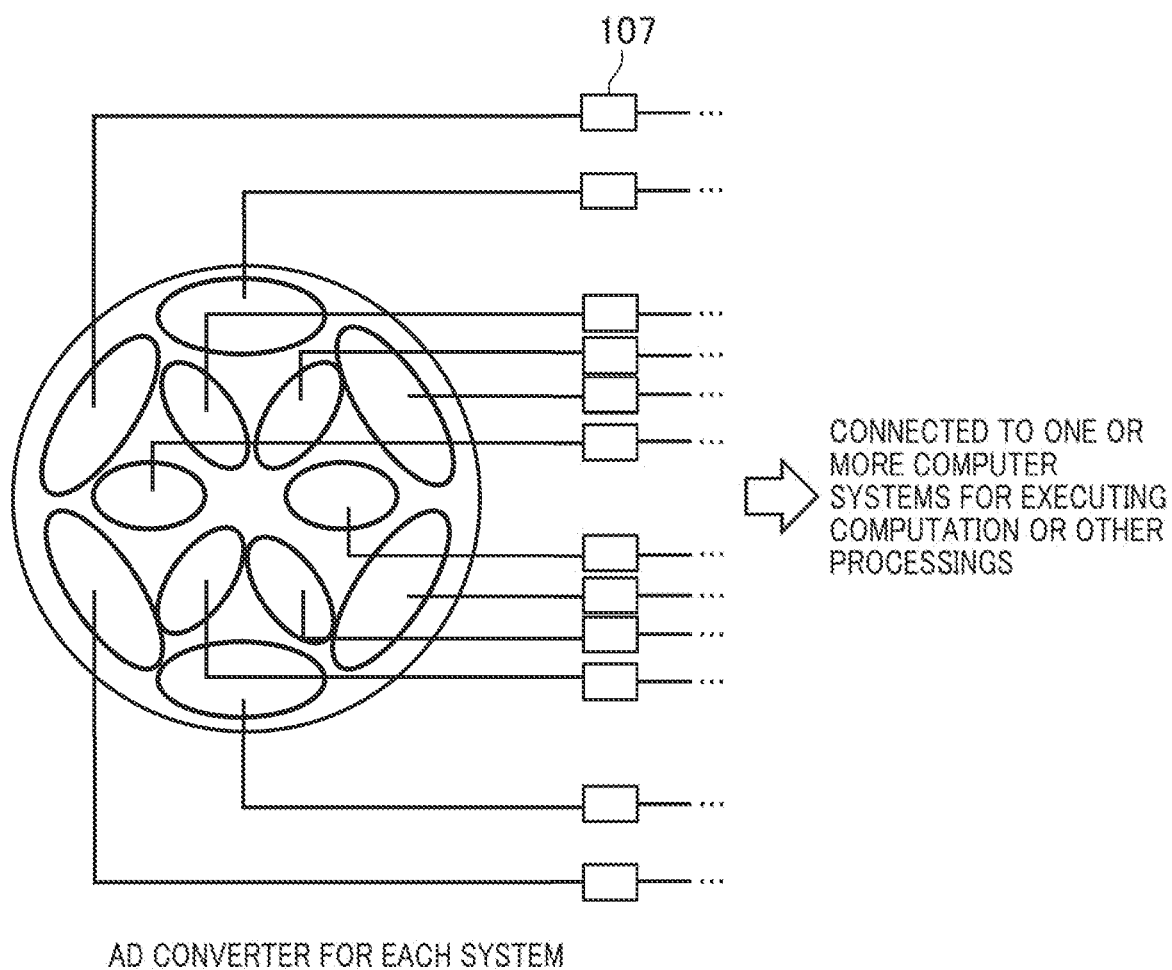
FIG. 3 illustrates an example of a signal processing system for processing an output signal of the detection system.

FIG. 3 illustrates an example of the signal processing system for executing signal processing of each output of the detection systems. As illustrated in FIG. 1A, the classification processing to be described later may be executed using the signal processing system 11 of the inspection apparatus 10.

Alternatively, as illustrated in FIG. 3, outputs of the detectors may be similarly processed using one or more other computer systems configured to be communicable with the inspection apparatus. Referring to the example of FIG. 3, outputs of the A/D conversion sections 107 may be transmitted to the external computer system.

<Configuration Example of System for Defect Classification>

Figure 4:
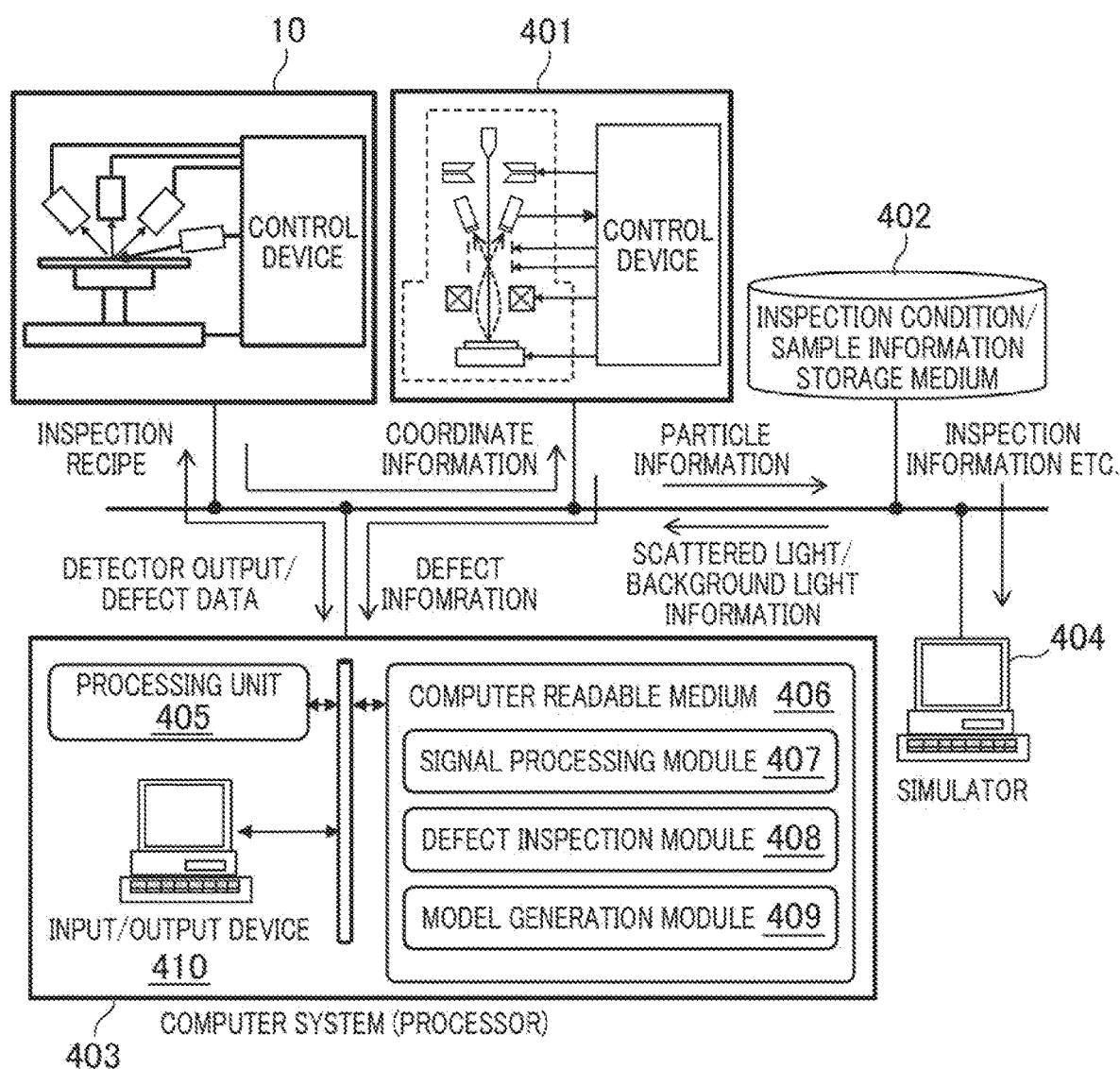
FIG. 4 illustrates an example of a defect inspection system including an inspection apparatus.

FIG. 4 illustrates an example of a system for classifying the defect or the like based on processing of outputs of the inspection apparatus 10. The system illustrated in FIG. 4 includes an electron microscope 401 in addition to the inspection apparatus 10. The electron microscope 401 is configured to generate an electron microscope (SEM) image of the defect based on the coordinate information of the defect output from the inspection apparatus 10, and to execute more detailed defect inspection and classification using the generated SEM image. The system illustrated in FIG. 4 further includes a storage medium 402 which stores an inspection condition of the inspection apparatus 10, and sample information on a sample to be inspected, and a simulator 404 which analyzes the scattered light intensity for each direction of the emitted light using Monte Carlo method.

The system includes a computer system 403 connected to those apparatus via a bus or a network. The computer system 403 is composed of one or more computer systems.

The computer system 403 includes a computer-readable medium 406, a processing unit 405 for executing the respective modules stored in the computer-readable medium 406, and an input/output device 410 which receives an input of information for generating teaching data or the like for a learning device.

The computer readable medium 406 stores a signal processing module (component) 407 for processing signals output from the inspection apparatus 10, a defect inspection module 408 for estimating type of the defect using the learning device such as the neural network, the regression tree, and the Bayesian classifier, and a model generation module 409 for training the learning device (model). The model generation module 409 is configured to train the learning device using teaching data constituted by data set including, for example, multiple outputs of multiple detectors of the inspection apparatus 10, a predetermined classification algorithm, defect type information input from the input/output device 410, ADC (Auto Defect Classification) results of the electron microscope 401, and the like.

The computer system as illustrated in FIG. 4 is composed of one or more computer systems each including one or more CPUs or GPUs. The one or more computer systems may be implemented by software which executes processings to be described later using one or more processors. They may be partially or entirely implemented by hardware such as electronic circuits and AI accelerators.

FIG. 4 illustrates the inspection system including the electron microscope 401. The system may be configured to include a scanning probe microscope such as an atomic force microscope (AFM) together with or in place of the electron microscope 401. As described later, the information derived from the electron microscope or the AFM as the labelling information concerning the particle may be stored in the storage medium 402 or the computer readable medium 406 so that teaching data for the learning device are generated.

The defect inspection module 408 includes, for example, a learning model having parameters adjusted so that the estimation processing is executed using the learning model. The learning model formed as, for example, the neural network includes one or more input layers, one or more intermediate layers (hidden layers), and one or more output layers as illustrated in FIG. 3.

The neural network executes learning by adjusting the parameter (weight, bias) to obtain desired classification results from the output layer. This makes it possible to provide appropriate outputs. The learning is executed by updating the variable (weight, bias) successively using, for example, an error back propagation algorithm (back propagation). An output error of data is partially differentiated using the weight (including an active function) for gradual adjustment to attain an optimum value.

In the neural network, the information input to the input layer is propagated sequentially to the intermediate layer, and to the output layer for outputting the estimated result. The intermediate layer is composed of multiple intermediate units. The information input to the input layer is weighted with a coupling coefficient between the input unit and the intermediate unit. The weighted information is then input to the intermediate unit. The input to the intermediate unit is added to obtain the value of the intermediate unit. The value of the intermediate unit is nonlinearly converted using an I/O function. The output from the intermediate unit is weighted with the coupling coefficient between the intermediate unit and the output unit. The weighted output is then input to each of the output units. The input to the output unit is added to obtain the output value of the output layer.

The parameters (constant, coefficient) such as the coupling coefficient between the respective units, and the coefficient which describes the I/O function of each unit are gradually optimized by proceeding learning. The optimized parameters are stored in a predetermined storage medium as learning results of the neural network. Similarly, in the case of using the learning device other than the neural network, the parameters optimized in the learning process are stored in the predetermined storage medium.

The model generation module 409 calculates an error between the estimated result derived from the defect inspection module 408 and the information input as correct answer data (teaching data). More specifically, the model generation module 409 calculates a conversion error between the estimated result derived from the forward propagation and the correct answer data. The model generation module 409 adjusts the neural network parameter (variable) based on the calculated conversion error to suppress the possible conversion error. Repetitive execution of the forward propagation and the back propagation makes it possible to improve the output accuracy.

<Function Configuration Example of Computer System 403 Constituting the Defect Classifying System>

Figure 5:
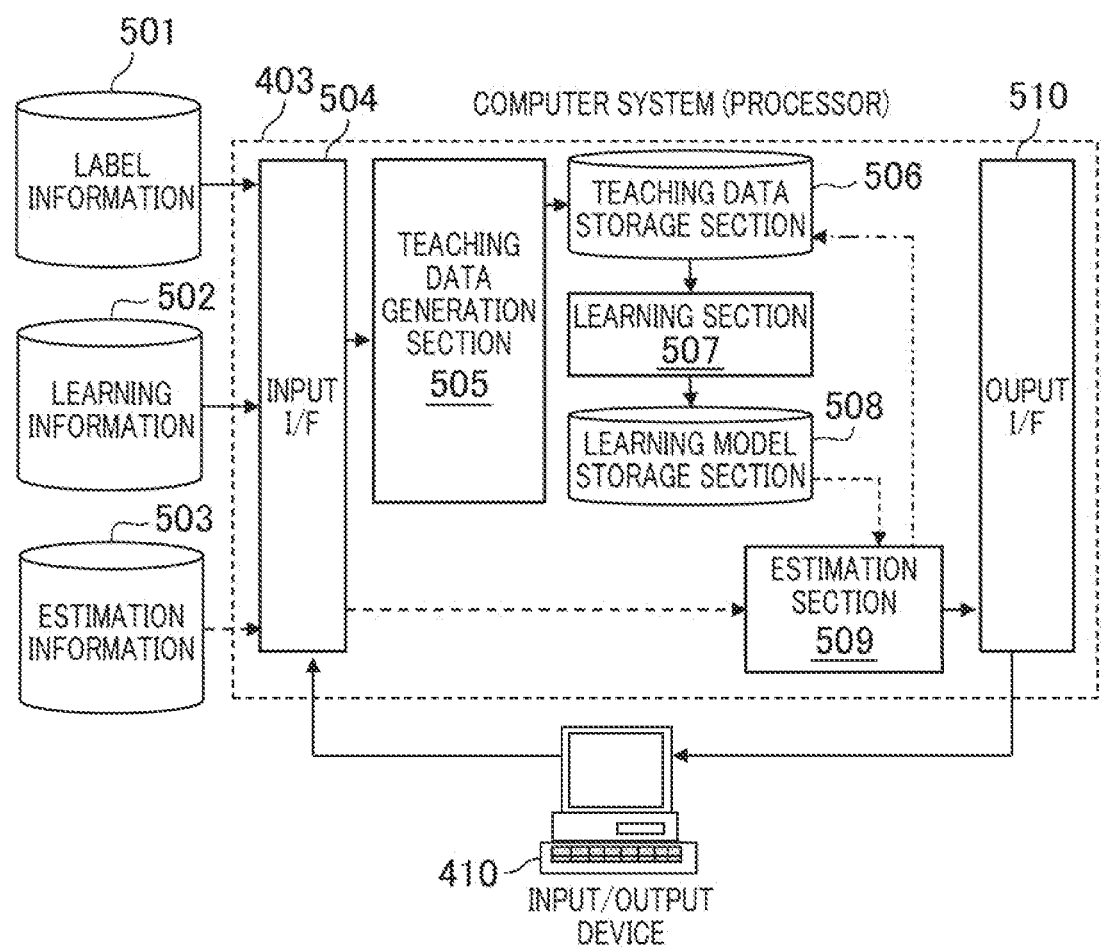
FIG. 5 illustrates an example of a computer system for executing the defect inspection.

FIG. 5 is a function block diagram of the computer system 403 as illustrated in FIG. 4. Referring to FIG. 5, the computer system 403 includes an input interface 504, a teaching data generation section 505, a teaching data storage section 506 for storing teaching data generated by the teaching data generation section 505, a learning section 507, and a learning model storage section 508 for storing a learning model trained based on the teaching data. The computer system 403 further includes an estimation section 509 for estimating results by inputting input data to the teaching model stored in the learning model storage section 508. Outputs (estimated results) of the estimation section are displayed on a display device of the input/output device 410 via an output interface 510, and the display section 114 of the inspection apparatus 10 as illustrated in FIG. 1.

In a learning phase, the computer system 403 receives information necessary for generating the teaching data from a label information storage medium 501 which stores information on type (classification) of the defect or the like, and from a learning information storage medium 502 which stores outputs of multiple detectors of the inspection apparatus 10, or multi-detector output information such as signals obtained by amplifying, adding, and subtracting those outputs so that the learning model is trained. In an estimation phase, the computer system receives outputs of the multiple detectors, which are stored in the estimation information storage medium 503, or multi-detector output information such as signals obtained by amplifying, adding, and subtracting those outputs so that estimation processing of the defect type or the like is executed.

The information estimated by the estimation section may be fed back to provide the new teaching data. It is also possible to output the information estimated by the estimation section and an operator's determination result to the teaching data storage section 506 as the teaching data as indicated by a dashed line. Referring to FIG. 5, each solid line arrow represents a data flow in the learning phase, and each broken line arrow represents a data flow in the estimation phase.

Explanations will be made about an estimation method, and an estimation system for identifying the type of the defect or the particle on the sample using the inspection apparatus and the system as described above, and a computer-readable medium for storing a program that allows one or more computers to execute the estimation processing.

<Scattered Light Intensity Distribution of Defect on Wafer>

FIG. 6 illustrates scattered light intensity distributions (simulation) obtained when irradiating a particle 601, a scratch A 602, a scratch B 603, and a COP (Crystal Originated Particle) 604, which are formed on the wafer with a laser beam from a diagonal direction relative to the wafer surface. FIG. 6A illustrates the scattered light intensity distribution obtained when irradiating the particle 601 with the laser. As the drawing illustrates, a hatched part indicates the scattered light intensity higher than that of the other part. As illustrated in FIG. 6A, the scattered light intensity distribution of the particle forms a symmetrical shape to a laser irradiation point (a symmetrical point of annularly arranged multiple detectors). The distribution indicates that the low-angle side intensity becomes relatively higher than the high-angle side intensity. Each of the scratches A 602 and B 603 is a recessed flaw extending in a specific direction. A relative angle formed between a virtual reference line (for example, line 605) and the longitudinal direction of the scratch A 602 is different from a relative angle formed between the virtual reference line and the longitudinal direction of the scratch B 603. Unlike the example of the particle, as the scratch is formed to extend in the specific direction, the resultant scattered light intensity distribution is likely to form an asymmetrical shape (FIGS. 6B, 6C). Furthermore, the scattered light intensity distribution derived from each of the scratches is likely to be formed in accordance with a formation angle.

The COP is a void defect as crystal defect type. Upon incidence of laser from a diagonal direction, the scattered light intensity distribution of the COP forms a symmetrical shape in a direction (left-right direction) orthogonal to the front-rear direction (when seen from the vertical direction to the wafer surface) as illustrated in FIG. 6D, and forms an asymmetrical shape in the front-rear direction. The scattered light intensity at the high-angle side becomes relatively higher compared with other defects.

Referring to the inspection apparatus as illustrated in FIGS. 1 and 2, multiple detectors are disposed each at the same elevation angle and at the different azimuth angle. Multiple detectors are also disposed each at the elevation angle different from the above-described elevation angle. This makes it possible to evaluate the scattered light intensity distribution which varies in accordance with the different defect type. For example, in the case of the particle 601, the scattered light detected by the low-angle side detector becomes symmetrical (each output of the low-angle detectors becomes at the same level). In the case of the COP 604, the scattered light becomes asymmetrical (output of the low-angle detector at the rear side becomes relatively larger than that of the low-angle detector at the front side). Meanwhile, in the case of the COP 604, the output of the high-angle detector is relatively larger than the one compared with the particle 601. Provision of the multiple low-angle and high-angle detectors allows execution of the defect classification based on at least two determination indexes.

In the case that DOI is an isotropically scattering particle (particle), it may be classified based on evaluation with respect to the left-right symmetry without using the teaching data. At least a part of the multiple detectors are disposed left-right symmetrically to the incident light to attain the classification as described above. Unlike the example of the particle, the scratch and noise exhibit the left-right asymmetrical distribution. Accordingly, they can be distinguished from the particle.

The information about the identified type of the particle, or the information about the type identified using the SEM and AFM is input to the system illustrated in FIG. 5 as the label information together with the output information of the multiple detectors in use as the learning information. This makes it possible to train the system for the defect classification based on the above-described principle. The scattered light intensity distribution of the scratch, which has been derived from the low-angle and the high-angle detectors becomes asymmetrical. The scattered light intensity distribution differs depending on the scratch forming angle. Inputting the multi-detector output information as the learning data together with the label information allows execution of highly advanced classification (estimation).

The detection optical system illustrated in FIG. 1 is provided with a wave plate 179 (half-wave plate) for splitting the light into polarized components. This makes it possible to execute polarization detection at +/−45° using the first sensor 174 and the second sensor 175 in the single inspection. The COP and the particle are evaluated based on the symmetry in the polarization detection results (ratio between the first sensor 174 and the second sensor 175, AND). If the result exhibits symmetry, the defect may be determined as the particle. If the result exhibits asymmetry, the defect may be determined as the COP. The similar determination may be made by the system configured to use an output from the comparative computing device for comparison among outputs of the multiple detectors with reference to the database which stores a relationship between the defect type and the comparative computed result.

The signal processing system 11 or the computer system 403 determines existence/non-existence of the defect by the threshold determination with respect to the detector output information. FIG. 7 schematically illustrates implementation of the threshold determination method. Referring to FIG. 7, as the size of the particle becomes larger, the signal intensity becomes higher. It is preferable to set the low threshold for detecting the micro particle. When setting the low threshold, however, noise may be determined as the particle erroneously. As illustrated in FIG. 7, if a threshold 708 is set under the condition that signals 701, 703, 705 indicate signal intensity values of a large-sized particle 702, a medium-sized particle 704, and a small-sized particle 706, respectively, erroneous detection of noise may be prevented. However, the small-sized particle 706 cannot be detected. On the contrary, when setting a threshold 709, a noise signal 707 may be erroneously detected together with the signal corresponding to the small particle.

The noise contains many shot noises owing to background light generated by minute unevenness (roughness) 708 on the wafer surface. As the shot noises are randomly generated, they are unlikely to be detected by multiple detectors simultaneously. In this embodiment, outputs of the multiple detectors are identified based on the threshold 709 at the level which tolerates the noise. It is further determined whether the output ratio among multiple detectors becomes a predetermined value or larger, whether an incidence of each signal of the multiple detectors, which is equal to or larger than the threshold becomes a predetermined value or larger, or whether all outputs of the multiple detectors exceed the threshold 709 (determination based on AND condition). If the condition is satisfied, it is determined that the signal indicates the defect. Otherwise, it is determined that the signal indicates the noise. This makes it possible to remove the noise component.

Determination is made on detectability using multiple detectors to separate the noise from the particles and defects. Thereafter, evaluation is made on symmetry and distribution of the scattered light intensity to attain the micro defect detection and high accuracy classification. The noise signal (multi-detector output information) is labelled as noise to separate the noise from the defect signal with higher accuracy.

The multi-detector output information, and the database representing the relationship between the defect type and noise are preliminarily provided to allow identification of the defect type, and noise filtering with reference to the database.

<Another Example of Defect Classification>

Figure 8A:
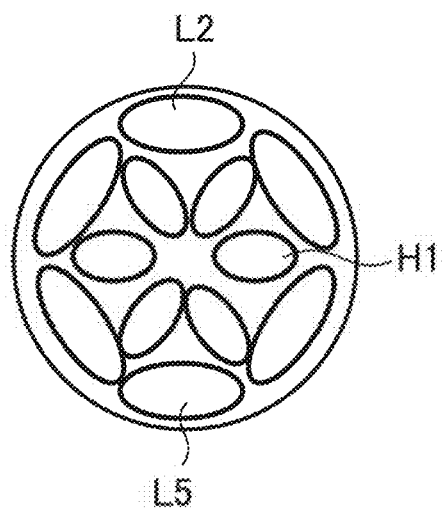
FIGS. 8A to 8D illustrate an example in which outputs of multiple detectors are plotted in a multidimensional space.
Figure 8B:
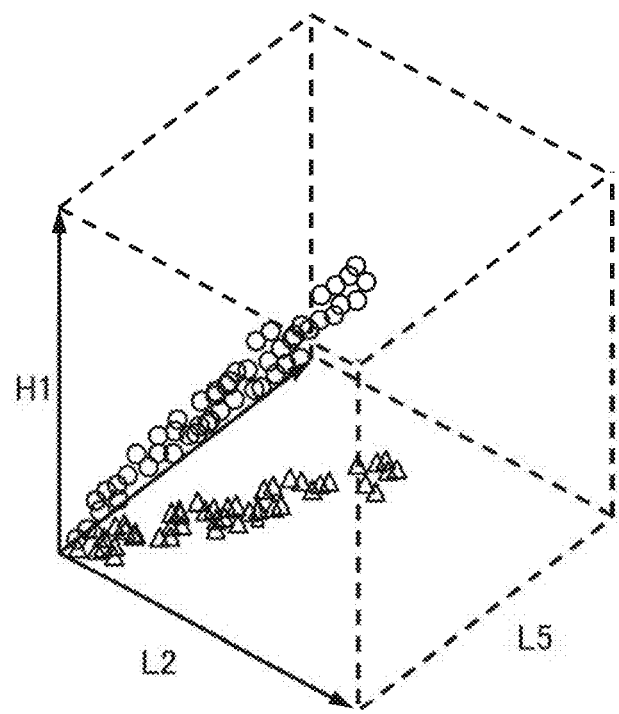

An explanation will be made about another example of the defect classification based on outputs of the multiple detectors. FIG. 8 represents an example in which outputs of multiple detectors are plotted in the multidimensional space. In this example, outputs of three detectors (L2, L5, H1) illustrated in FIG. 8A are plotted in the three-dimensional space (FIG. 8B) for easy explanation. The outputs may be plotted in the three or more-dimensional space in accordance with the number of detectors. Referring to the example in FIG. 8, the COP is represented by a circle mark, and the particle is represented by a triangle mark. As the size of the particle becomes larger, the signal intensity becomes higher as described above. Each size of the particle and the COP becomes small as they get closer to the origin.

Figure 8C:
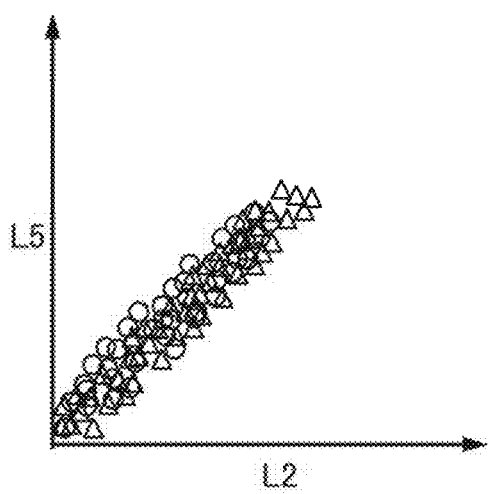
Figure 8D:
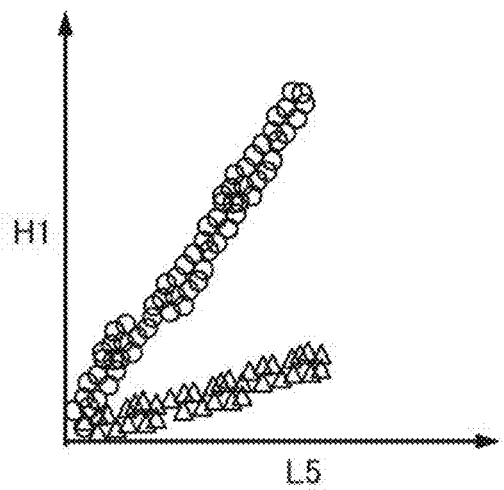

Referring to FIG. 8C, when viewing outputs of the L2 and L5 in the two-dimensional space, there is not much difference in the distribution between the particle and the COP. It is therefore difficult to distinguish between the particle and the COP based on outputs of those two detectors. Meanwhile, when viewing outputs of the L5 and H1 in the two-dimensional space as illustrated in FIG. 8D, a clear difference in the distribution exists between the particle and the COP. Outputs of three or more detectors each disposed at the different elevation angle and the different azimuth angle are plotted in the multidimensional space to allow selection of the dimension for separating the particle from multiple candidates.

The boundary in the multidimensional space is evaluated from multiple directions to allow estimation of size of minimum classifiable particle. Outputs of three or more detectors are plotted in the multidimensional space to allow formation of a curved boundary with higher classifying accuracy based on each boundary between clusters in each dimension.

<Details of Labeling Processing>

The specific method of labeling for constructing the learning model will be described. FIG. 9 is a flowchart representing a process for executing labeling based on comparison between the scattered light simulation result and the result of inspecting the real sample. For executing the simulation, the inspection condition and the sample information are input from the storage medium 402 to the simulator 404 based on an instruction input from the input/output device 410 (step 901). Information of the particle and the COP may be input from the input/output device 410.

Such information which has been preliminarily stored in the storage medium may be read and input to the simulator 404.

Figure 10A:
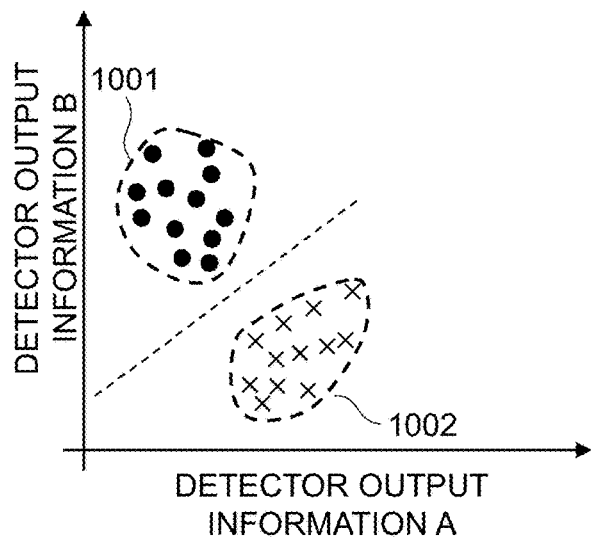
FIGS. 10A to 10D illustrate an example in which outputs of multiple detectors are plotted in a multidimensional space.

In the simulation, the scattered light intensity distribution in accordance with the shape and reflection factor of the particle is obtained using the Monte Carlo method, for example (step 902). The scattered light intensity at the elevation angle and the azimuth angle at which the detector is positioned is calculated (step 903). When the respective values of scattered light intensity detected by multiple detectors are obtained, information of combined outputs is labeled using the information about the type of the defect, which has been input in step 901 (step 904). Results of estimating the scattered light intensity are plotted in the multidimensional space having an output of the single detector being in one dimension (step 905). FIG. 10A illustrates an example in which the scattered light intensity data of multiple detectors (detector outputs), which have been derived from simulation are plotted in the multidimensional space. FIG. 10 illustrates the two-dimensional space as an example for simplifying the explanation. Preferably, the space is exemplified as three or more-dimensional space.

FIG. 10A illustrates an example in which multiple simulation results are plotted, which have been derived from the simulation executed to multiple particles. Especially, based on the input defect type, feature values plotted in a space 1001 are labeled as type A, and feature values plotted in a space 1002 are labeled as type B.

The foregoing processing attains construction of the learning device capable of estimating the defect type based on outputs from the inspection apparatus provided with multiple detectors.

Referring to the flowchart in FIG. 9, the processing for inspecting the real sample is executed in addition to the processing from steps 901 to 905 to generate a cluster in the multidimensional space. In the processing of inspecting the real sample (step 906), the scattered light intensity is detected by the multiple detectors, and the detected results are plotted in the multidimensional space (step 907). The boundary between different clusters is set in the multidimensional space (feature value space). In this case, the plotted results are displayed in two or three dimensions on the display section 114. The boundary may be set by the external input section 112 by visually determining the boundary between the clusters (S908). Alternatively, the boundary may be automatically set by the computer system 403 using a k-means method or the like.

Figure 10B:
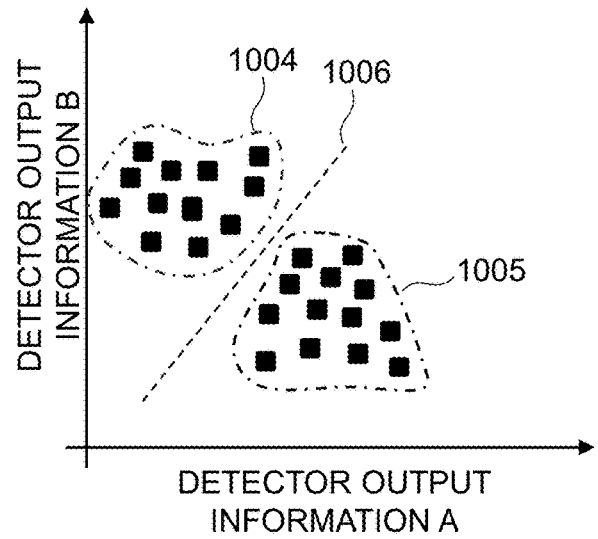

FIG. 10B illustrates an example in which multiple feature values derived from the inspection of the real sample are plotted. As the feature values derived from the real inspection are not classified yet, the plotted feature values in the two spaces 1004 and 1005 are represented by black square marks.

Figure 10C:
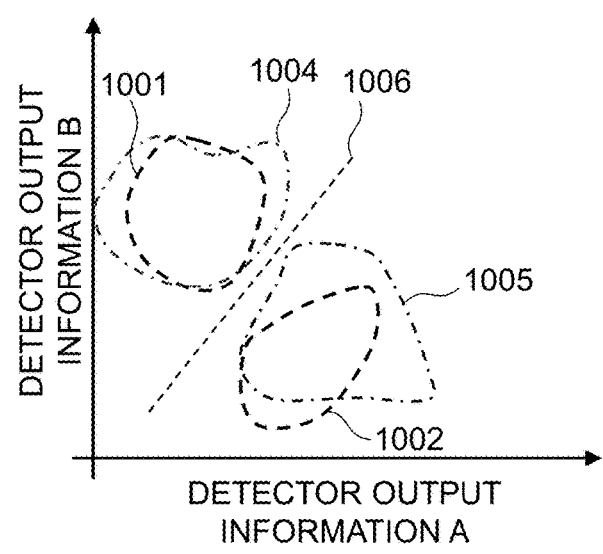
Figure 10D:
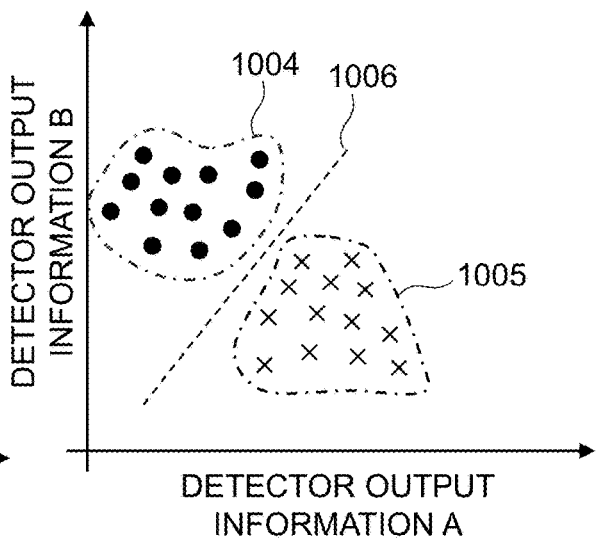

A comparison is made between the scattered light intensity distribution (plotted result) derived from the scattered light simulation and the scattered light intensity result based on the real sample inspection (step 909). FIG. 10C illustrates the comparative result, indicating the state where two plotted results are superposed. The space 1001 includes a cluster of feature values labeled as type A derived from the scattered light simulation. The space 1004 includes a cluster of feature values identified by real measurement using the real sample. The feature value group contained in the space 1004 is not labeled. However, as the group is positioned near the space 1001 containing the feature value group labeled as type A, it may be estimated that the cluster contained in the space 1004 is labeled as the type A. In the multiple spaces each derived from the different process, the feature value groups having the shortest distance between the respective gravity centers are selected. Then the labeling information of one of the groups is imparted to the other feature value group. This makes it possible to set the accurate boundary (boundary line 1006) derived from the real sample inspection, and to label the feature value group derived from the real sample inspection (step 910).

<Labeling to Feature Value>

An explanation will be made about the method for executing labeling to the feature value (multi-detector output information) based on the information derived from inspection executed multiple times. The wafer is introduced into the inspection apparatus 10 (step 1101), and subjected to the inspection multiple times (for example, 10 times) (step 1102). When inspecting the same wafer multiple times, the same defect is detected on the same coordinate. Meanwhile, as the noise is randomly generated, it is unlikely that the noise detected on the coordinate in an inspection is detected in another inspection again. FIG. 11 represents the information collection process. In the process, in accordance with the detection rate (capture rate) of the signal having the scattered light intensity equal to or larger than the threshold on the same coordinate, a determination is made whether the signal on the coordinate is originated from the real defect or noise. The result is collected as the label information for learning.

After execution of the inspection multiple times, or in the inspection, the computer system 403 extracts the defect candidate by the threshold determination (step 1103). Similar to the threshold 709 in FIG. 7, the threshold in this case is set to allow detection of the noise to a certain extent. By executing the inspection multiple times, the capture rate is calculated for each coordinate on which the signal equal to or larger than the threshold is obtained (step 1104). The signal on the coordinate having the capture rate equal to or larger than the predetermined value (for example, 90% or higher) is labeled as the real defect, and the signal on the coordinate having the capture rate smaller than the predetermined value is labeled as the noise (false report) (step 1105). In the case where the capture rate is equal to or larger than the predetermined value, and a predetermined number or more units of the multiple detectors output the signals equal to or higher than the threshold, it may be determined that the signal is originated from the real defect (if the condition is not satisfied, it is determined that the signal is originated from the noise). In the case where the relationship among signals each equal to or higher than the threshold, which have been output from the multiple detectors is in the predetermined state (symmetrical, scattered light distribution caused by the specific defect), it may be determined that the signal is originated from the real defect.

The teaching data are generated using the selected signal as described above, and the labeling information indicating either the real defect or the noise. The generated teaching data are used for training the learning device to allow construction of the learning device capable of executing highly advanced distinguishment between the real defect and the noise (steps 1106, 1107). The output signals each determined as the noise are labeled as either noise or nuisance to allow construction of the learning device for distinguishment between the DOI and the nuisance with higher accuracy.

It is possible to execute more specific classification with respect to the signal classified as the real defect through the classification process represented by the flowchart in FIG. 11 as described below. It is possible to store information about the coordinate on which the signal exhibiting the value equal to or higher than the capture rate is detected in the storage medium 402. The computer system 403 may be configured to automatically generate an operation program (recipe) of the electron microscope 401. The electron microscope 401 controlled in accordance with the generated recipe acquires an SEM image of the coordinate on which the signal exhibiting the value equal to or higher than the capture rate is detected. For example, the ADC is executed with respect to the acquired SEM image for labeling based on the ADC result. The more specific defect type may be formed into the label data.

Coordinates in the range where the capture rate is approximate to the predetermined value (for example, assuming that the capture rate CP1 is 90%, it is ranged from 88% (CP2) to 92% (CP3), that is, CP2≤CP1≤CP3) may be reviewed using the electron microscope in place of, or in addition to the coordinate on which the capture rate is equal to or higher than the predetermined value. It is difficult to determine whether the signal identified to be approximate to the threshold is originated from the real defect or the false report. The above-described coordinate is selectively reviewed to collect data for appropriate learning while suppressing the review to be carried out excessive number of times. After observation using the SEM, if the image of the particle cannot be acquired, it is determined that the signal is originated from noise so that labeling is executed.

Figure 12:
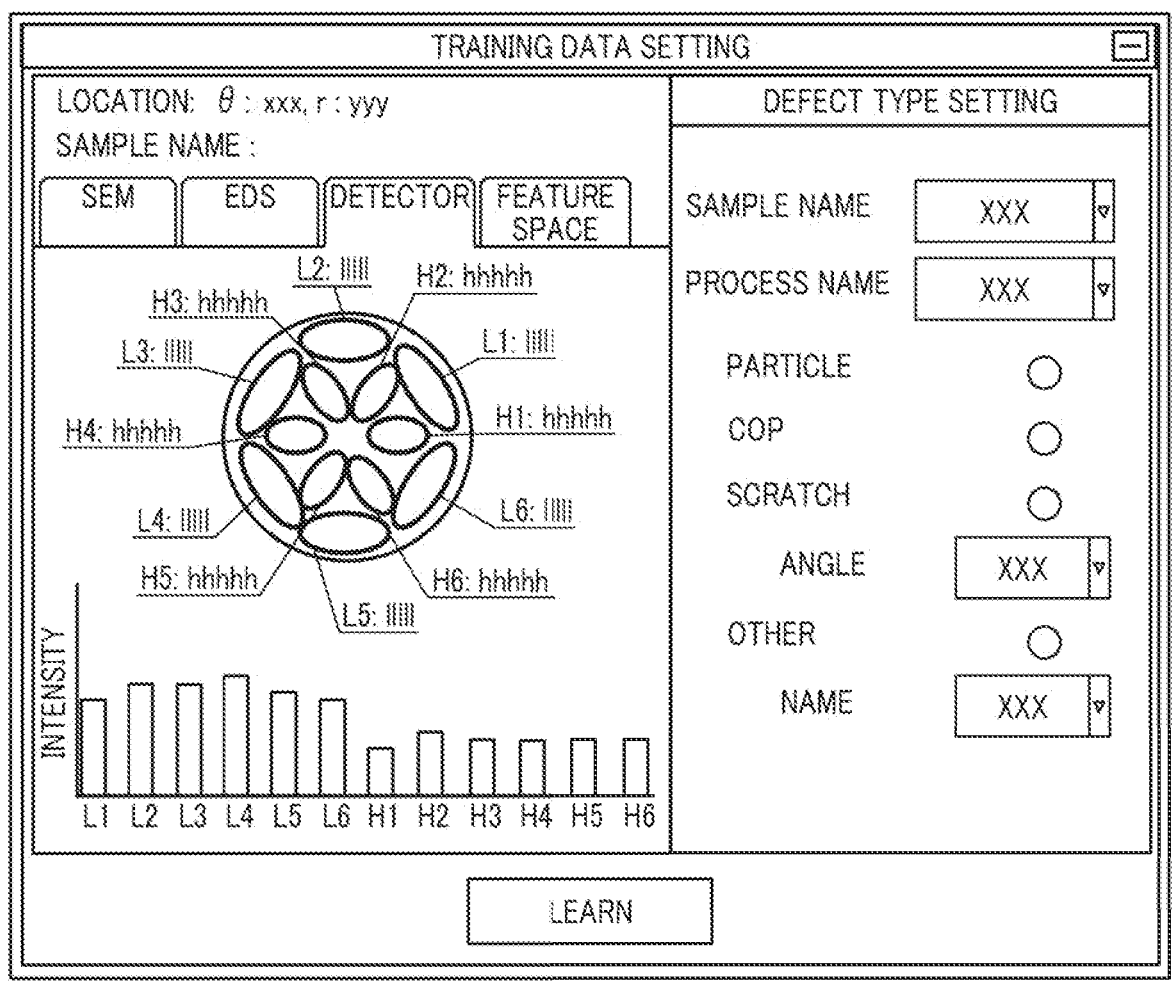
FIG. 12 illustrates an example of a GUI (Graphical User Interface) screen through which labeling information is input.

Instead of executing the ADC, the label information may be manually input from a GUI screen as illustrated in FIG. 12. Referring to FIG. 12, the left section of the GUI screen is a display field for displaying information relating to the defect on a specific coordinate, and the right section is an input field through which the label information is input. The left section includes tags for selecting the SEM images, X-ray analysis results based on detector outputs of X-ray detectors (not shown) in the electron microscope, results of multi-detector outputs of the inspection apparatus 10, and results of plotting the multi-detector output results of the inspection apparatus 10. The information to be displayed as a result of selecting each of those tags is output from the inspection apparatus 10 and the electron microscope 401.

The defect type information is input to the right section with reference to the left section as illustrated in FIG. 12. This makes it possible to execute labeling based on the knowledge supported by an operator's experience.

<Another Defect Classification Processing Using Learning Device>

Figure 13:
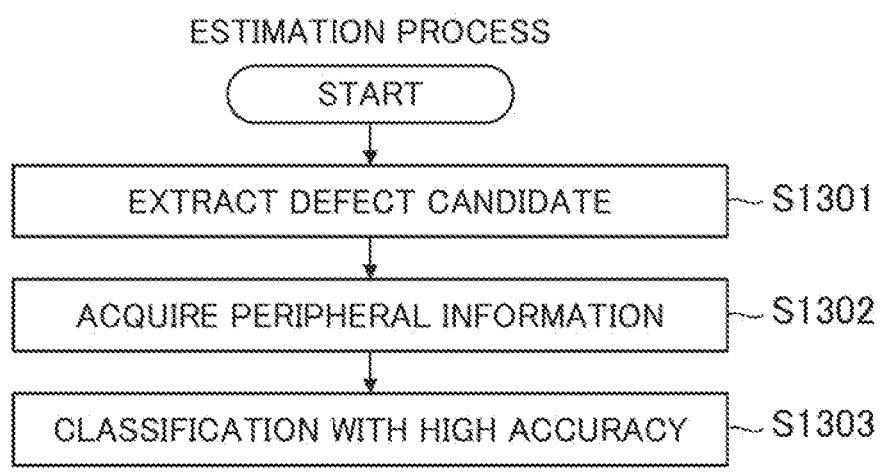
FIG. 13 is a flowchart representing a defect classifying process using the learning device.

Another defect classification method using the learning device will be described. FIG. 13 is a flowchart representing an inspection process. The relatively low threshold is set to tolerate noise, and the defect candidates are extracted (step 1301). At this time, the defect information in the wide region containing sampling points is acquired. The method for acquiring the wide-region information will be described later. In step 1301 where the defect candidates are extracted, the threshold determination is executed to the sum total of outputs of multiple low-angle detectors for approximate execution of the defect candidate classification. After extraction of the defect candidates, the peripheral information is also acquired, and stored collectively (step 1302). The reason for executing the above-described processing will be described below.

Figure 14A:
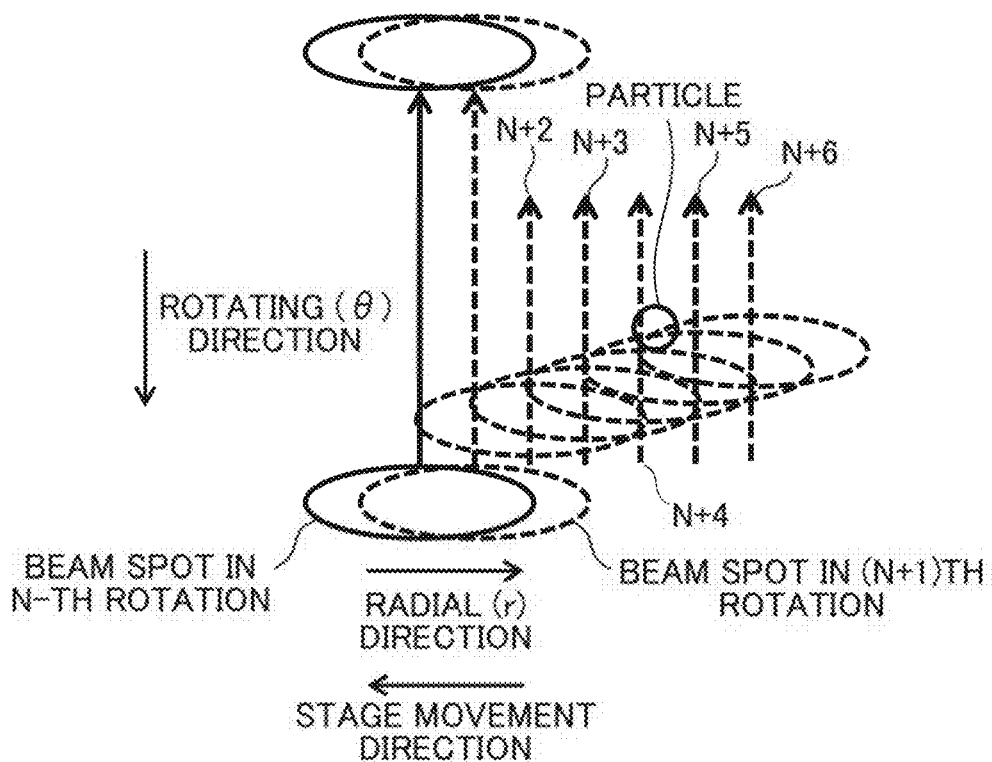
FIGS. 14A and 14B illustrate a transitional state of scattered light intensity detected by the detector upon irradiation of a particle with a beam.
Figure 14B:
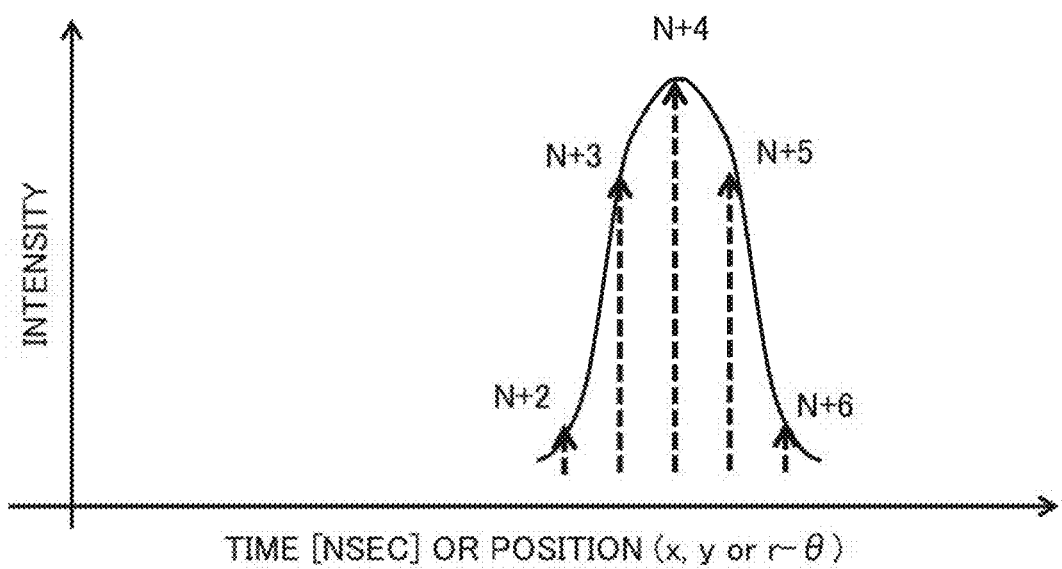

FIG. 14 illustrates a transitional state of the scattered light intensity detected by the detector upon irradiation of the particle with the beam. The inspection apparatus 10 as illustrated in FIG. 1 includes an r-θ stage. The wafer moves in a radial direction while rotating. Referring to FIG. 14, the beam spot moves on the wafer in association with movement of the stage. As FIG. 14A illustrates, the inspection apparatus 10 is irradiated so that the beam spot formed in the Nth rotation is overlapped with the beam spot formed in the (N+1)th rotation. Accordingly, if the particle (independent defect) exists on the wafer, the particle is irradiated with beams each at different rotation speed multiple times. The output result has a Gauss shape in the direction r. Meanwhile, if noise exists, the signal is randomly generated. Accordingly, the output result fails to approximate the Gauss distribution as illustrated in FIG. 14B. If fitting of the output signal allows the output result to be approximate to the Gauss distribution, it may be determined that the real defect exists. If fitting cannot be executed to the output signal, it may be determined that noise exists.

Figure 15:
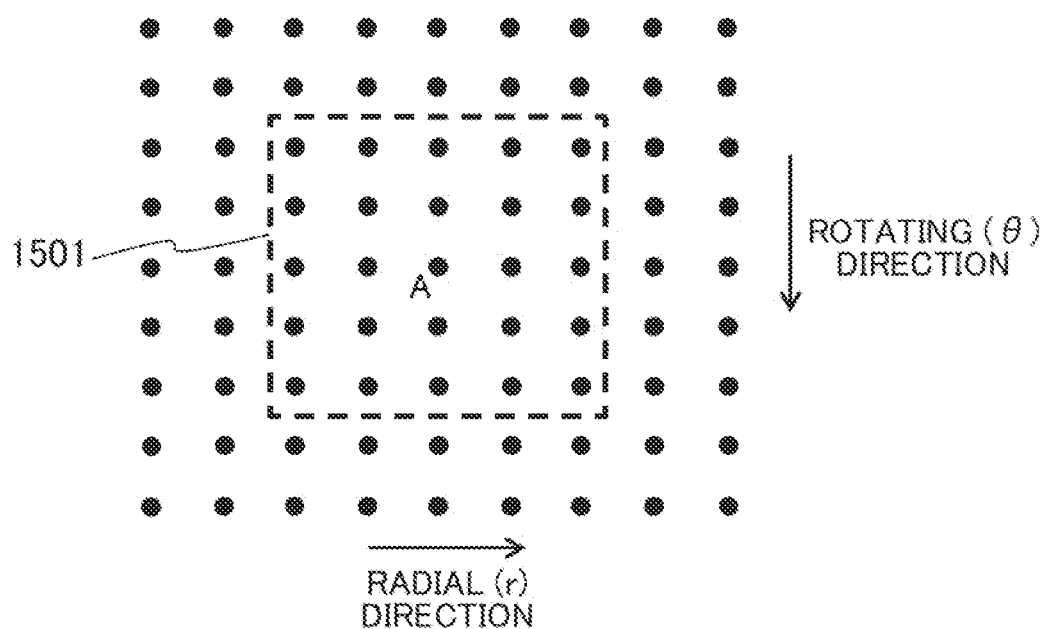
FIG. 15 is an explanatory view of an information storage example indicating that sampling point information is acquired together with peripheral information.

FIG. 15 illustrates a positional relationship between the sampling point A identified by the threshold determination, and the peripheral signals acquired together with the sampling point A. If the signal in excess of the predetermined threshold is detected at the sampling point A, a peripheral area 1501 (for example, output signal in a range of n×m sampling points arranged around the sampling point A as the center) is stored. It is preferable to execute the real defect/noise determination based on acquired information of multiple points in the subsequent process for executing high accuracy classification to the defect candidate. Explanations will be made about the reason for executing the process as described above as well as the processing to be executed in step 1302 onward.

After acquisition of the peripheral information, the high accuracy classification is executed to the defect candidate information and the peripheral information which have been stored using outputs of the detectors more than those used for the candidate determination executed in step 1301 so that the inspection is executed with higher accuracy (step 1303). Execution of the high accuracy classification through the fitting processing takes relatively longer time compared with the rough classification of the defect candidates. Taking much time for the processing may fail to operate the inspection apparatus with high operation rate. In this embodiment, the rough classification (which tolerates mixture of noise) using outputs of small number of detectors. The high accuracy classification is executed to the roughly classified result using relatively larger number of detectors (multiple low elevation angle detectors and multiple high elevation angle detectors) in step 1303. The high accuracy classification is executed using widely ranged detector outputs (for example, raw data).

Execution of the high accuracy classification to all the defect candidates takes much time. The rough classification is executed up to the stage of peripheral data collection, and the classification is further executed using the peripheral data collected in the high accuracy classification. This makes it possible to execute the classification with high efficiency and high accuracy.

Data equivalent to N cycles are stored in a signal buffer (FIFO: First In First Out) to allow execution of steps 1301 to 1303 repeatedly. In this case, the original signal data corresponding to the N cycles may be referred. However, the processing using data prior to the N cycles has to be completed before execution of the next scanning.

Each defect extending in the specific direction forms the Gauss distribution extending in the specific direction. It is possible to execute the high accuracy classification using the two-dimensional distribution information (detector output information in the two-dimensional region including multiple sampling points which contain the defect candidate coordinate) by preliminarily providing a table indicating a relationship between the defect type and the fitting shape of the scattered light intensity distribution in the two-dimensional region. It is also possible to execute the classification using the neural network by training the learning device with teaching data derived from labeling indicating the defect type to the two-dimensional distribution information.

<Setting of Inspection Condition>

Figure 16:
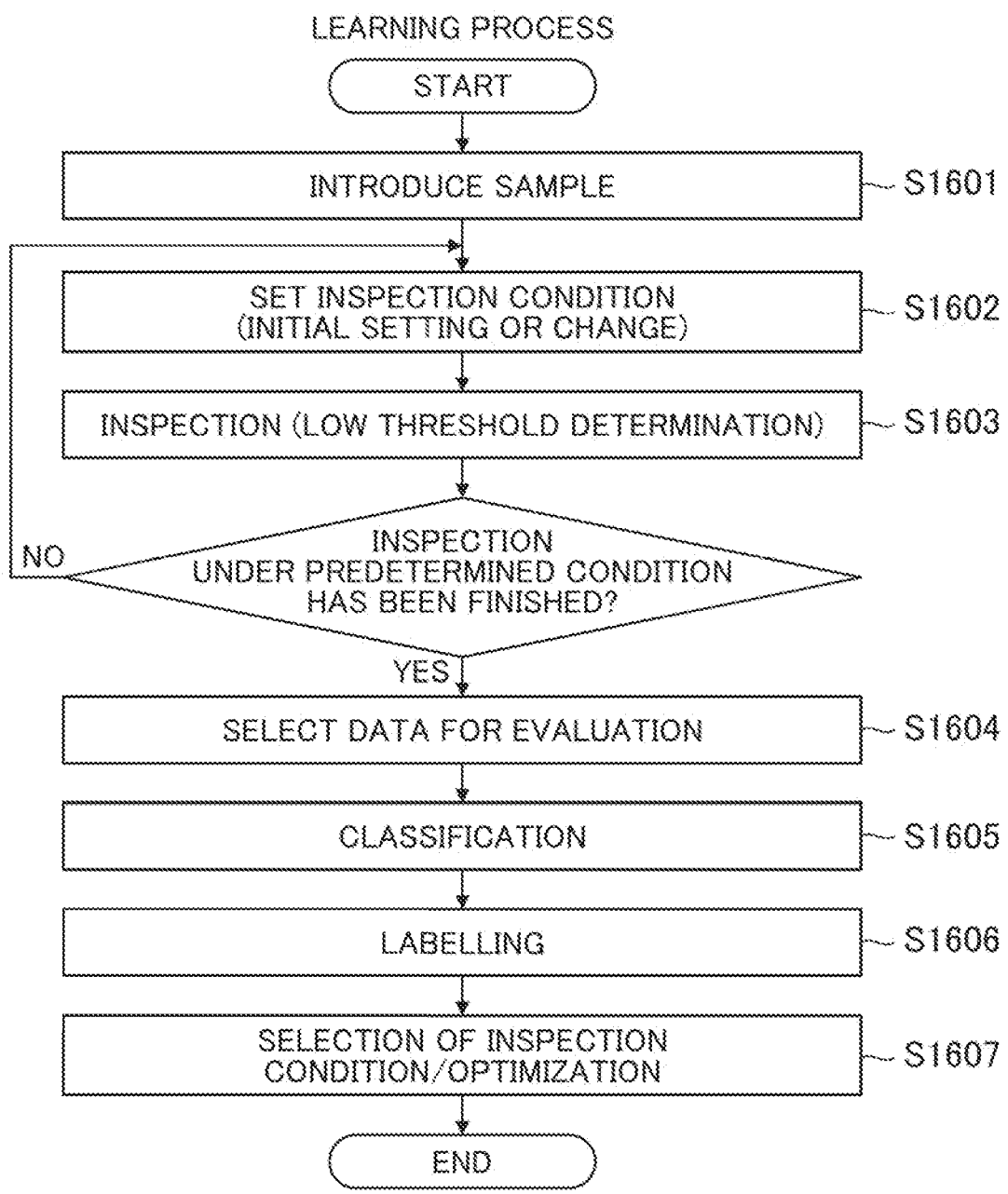
FIG. 16 is a flowchart representing a process for training the learning device, and setting inspection conditions, based on which the inspection is executed using the learning device.

An explanation will be made about the computer system or the inspection apparatus for setting appropriate learning and appropriate inspection conditions. FIG. 16 is a flowchart representing the process for setting training of the learning device, and the inspection condition under which the inspection is executed using the learning device. A wafer as an inspection target is introduced into a sample chamber of the inspection apparatus 10 (step 1601). The inspection apparatus 10 executes inspection of the wafer under a preliminarily set optical condition (steps 1602, 1603). The inspection is executed by setting the threshold at the level which tolerates noise like the threshold 709 in FIG. 7 so that the defect candidate is extracted. The low threshold inspection is executed under multiple inspection conditions. The inspection condition may be changed in accordance with outputs of laser as the light source of the inspection apparatus, polarization conditions of the incident light, or detection conditions of the detection system. The inspection condition includes existence/non-existence of the BS, and an angle of the wave plate.

The defect candidate for evaluation (teaching) is selected (step 1604). It is preferable to select the defect required to be identified, and the defect positioned around the boundary between the clusters in the feature value space. Preferably, the defect candidates are selected evenly in the feature value space on the premise that they are selected as the teaching data for the learning device. In this case, the defect candidates suitable for the teaching data are selected. The selected defect candidate is classified as the real defect or the false report (S1605). The classification may be performed by executing the inspection multiple times repeatedly under the same inspection conditions as represented in FIG. 11, for example. Alternatively, the classification may be executed by generating a recipe for the electron microscope 401 based on the coordinate information of the selected defect candidate, and identifying the defect type based on the inspection using the electron microscope. The computer system 403 may be configured to execute the above-described processing automatically based on the preliminarily stored program. It is also possible to allow the operator to determine whether the defect candidate is the real defect or the false report, or to select the defect type with reference to the necessary information displayed on the GUI as illustrated in FIG. 12 (S1606).

After the classification as described above, the inspection condition suitable for the inspection apparatus is selected (step 1607). The inspection condition suitable for classification of the real defect/false report, or classification and detection of the defect type is selected. The method for selecting the inspection condition may be implemented as described below. For example, the distance from the boundary set in the feature value space, or the distance from the gravity center of the cluster is set as the evaluation criteria to select the inspection condition in which the distance to the cluster or the region to be classified is relatively reduced. It is also possible to select the inspection condition having a relatively higher S/N of the signal as the parameter. The above-described processing is automatically executed to allow setting of the inspection conditions suitable for training of the learning device and classification using the learning device.

Additionally, apparatus conditions and processing may be optimized. Specifically, load distribution conditions upon parallel signal processing of the CPU and the GPU may be optimized. In such a case, the real inspection is executed to learn the load state in each processing upon inspection so that allocation to the CPU core is changed. More specifically, the parallel processing is executed in the server, the core is selected, and the learning result is used to determine as to which processing is allocated to which core. In the case of the detection system as illustrated in FIG. 1B, increase in the number of splits weakens the signal. Accordingly, the detection system condition in which the number of splits is relatively small may be selected from the apparatus conditions which satisfy the predetermined condition.

<Labeling Processing Before/after Semiconductor Manufacturing Process>

FIG. 17 is a flowchart representing a labeling process for training the learning device based on the information acquired before/after execution of the semiconductor manufacturing process. The semiconductor manufacturing process includes a cleaning processing for cleaning the semiconductor surface. A particle contained in a cleaning solution may influence the subsequent manufacturing process. Accordingly, the cleaning process has to be suitably managed. In this embodiment, an explanation will be made about a teaching data generating process which allows training of the learning device suitable for management of the cleaning process or the like.

Figures 18A, 18B:
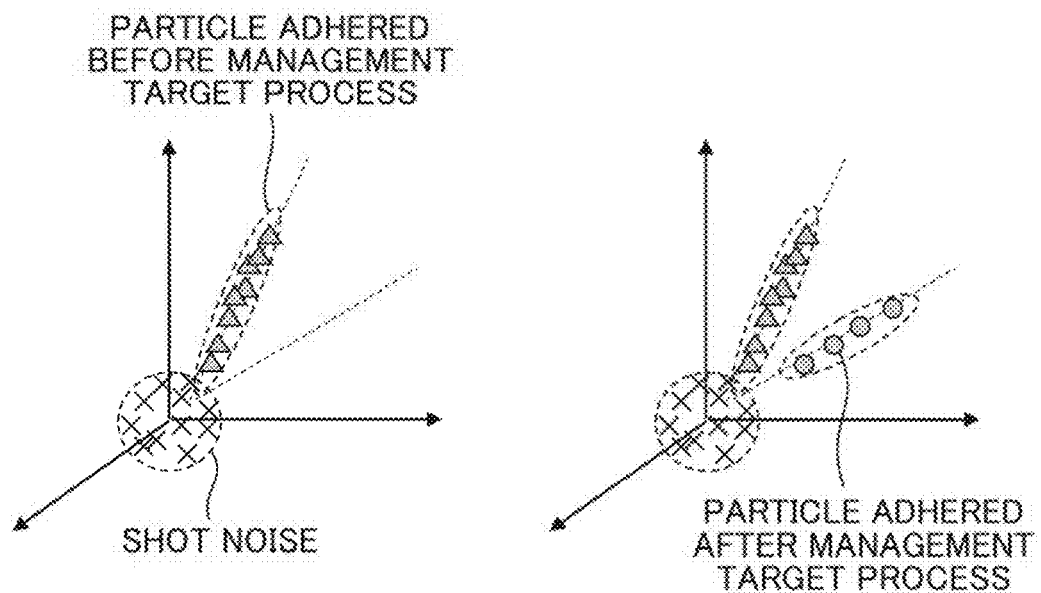
FIGS. 18A to 18C illustrate an example in which output signal information before and after execution of management target process is plotted in the multidimensional space.

A wafer 1701 illustrated in FIG. 17 is in the state before execution of a management target process (cleaning process and chemical reaction process). In the semiconductor inspection process, a first inspection is executed to the wafer 1701 using the inspection apparatus 10. The computer system 403 stores the output signal information of the corresponding detector, and coordinate information in a predetermined storage medium. FIG. 18A illustrates an example in which the detector output signal information acquired by the first inspection is plotted in the multidimensional space. In the first inspection, it is preferable to execute a highly sensitive inspection for generating the teaching data in the subsequent process. The highly sensitive inspection is executed by, for example, scanning the wafer at low speeds to increase scattered light quantity from the defect. Upon increase in the scattered light quantity from the defect, the noise reduction processing is executed to allow reduction in variation of the defect and the shot noise. This makes it possible to improve sensitivity. Execution of the process for generating the teaching data hardly causes problems despite extension of time taken for the comparative inspection.

In order to execute the highly sensitive inspection, the feed pitch in the direction r of the stage is narrowed to increase an overlap amount of beam major axes so that the stable signal is acquired. The position of the same wafer in the direction r is inspected multiple times by stopping the movement in the direction r so that an average is taken. The randomly generated noise is removed in the processing to emphasize only the real signal. More specifically, the inspection is normally executed at the positions from R1 (radial position of the wafer), R2, R3, ... to Rfinal. Meanwhile, the inspection is executed repeatedly at each position from R1, R2, R3, ... to Rfinal. The inspection time is obtained by multiplying the normal inspection time by the number of repeated inspections. Alternatively, the beam diameter may be reduced to narrow the feed pitch, or the rotation speed may be lowered to increase the integrated value of the scattered light quantity as the beam passes the defect.

The highly sensitive inspection may be executed by execution of the inspection multiple times as represented in FIG. 11. Execution of the highly sensitive inspection weakens the influence of the shot noise, and reduces the variation in outputs in the feature value space, resulting in approximation to the true value. FIG. 18A indicates that the inspection executed multiple times as represented in FIG. 11 clarifies the difference between the DOI such as the particle and the shot noise as a part of the nuisance in the feature value space. This makes it possible to execute labeling either as the DOI or the nuisance as needed. If the comparative process to be described later is executed based on the signal detected using the threshold, the shot noise is removed in this stage. The computer system 403 stores the identification information, the detector output information, and the coordinate information in the predetermined storage medium collectively.

A second inspection is executed to a wafer 1702 corresponding to the wafer which has been subjected to the management target process. In this case, the highly sensitive inspection is executed as well. FIG. 18B illustrates an example in which the detector output signal information acquired from the second inspection is plotted in the multidimensional space. FIG. 18B illustrates feature values of particles which have been adhered in the management target process in addition to those existing before execution of the management target process. In the inspection, the shot noise is removed similarly to the first inspection.

A comparison is made between the wafers before and after execution of the management target process on each coordinate on which the predetermined feature value is acquired (the coordinate on which the detector output becomes equal to or larger than a predetermined value). The newly generated defect, which has not been detected in the first inspection is regarded as the particle adhered in the management target process. For the purpose of managing the management target process, preferably, the learning device is configured to selectively classify the defect generated in the management target process as the DOI. The computer system 403 then applies labeling indicating nuisance to the defect which has been labeled as the DOI on the wafer 1701 as a result of the coordinate comparison. If the particle which has not been detected on the wafer 1701, but newly determined as the DOI on the wafer 1702, such particle is labeled as the DOI.

Learning is executed based on the label information generated by executing the above-described process to allow formation of the learning device suitable for evaluating the management target process.

The first and the second inspections may be executed without the threshold determination, or using the low threshold. Upon the inspection without using the threshold, if the distance of the feature value in the feature value space between before and after execution of the management target process is equal to or longer than a predetermined value, and the size (signal amount) is equal to or larger than a predetermined value, the label information indicating the DOI may be generated, and otherwise, the label information indicating the nuisance is generated. If the inspection is executed using the threshold, or the shot noise is removed, data obtained before execution of the management target process are compared with those obtained after execution of the management target process based on the defect data coordinate which exists after execution of the management target process. This makes it possible to determine whether the label information indicates the DOI (newly detected in the second inspection), or the nuisance (defect is detected on the same coordinate both in the first and the second inspections).

An inspection using the inspection apparatus 10 under the inspection apparatus condition (sensitivity) in a normal operation state is executed to the wafer 1702 as a target of the second inspection. Compared with the case of the highly sensitive inspection, the inspection apparatus in the normal operation state has to be operated while considering the throughput. It is therefore difficult to perform the work which may lower the throughput such as the inspection executed multiple times. An explanation will be made about the method for forming a learning device which allows estimation without executing the inspection multiple times utilizing the learning device which has been trained with the label information derived from the highly sensitive inspection.

Figure 18C:
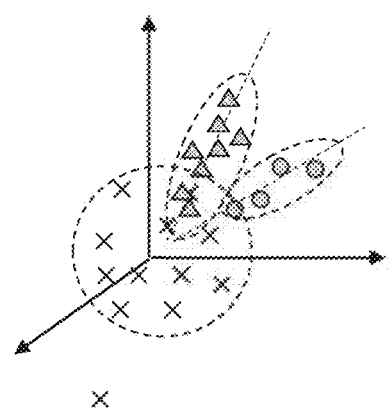

FIG. 18C illustrates a state where output signal information acquired in the normal operation state is plotted in the multidimensional space. Compared with the case of highly sensitive inspection, accuracy of the inspection in the normal operation state is relatively low. This may cause variation in the inspection results, or may change the distribution in the feature value space.

As the same wafer is inspected both in the highly sensitive inspection and the normal operation, the same defect exists on the same coordinate. It is possible to use the label on each coordinate applied in the highly sensitive inspection for the feature value obtained in the inspection in the normal operation state. The label on each coordinate in the highly sensitive inspection is applied to the coordinate on which the feature value of the inspection in the normal operation state is obtained. Such label is then set as the one indicating the feature value of the inspection in the normal operation state.

Labeling is executed repeatedly by acquiring the feature values upon inspection in the normal operation state, and making a comparison with the information derived from the highly sensitive inspection. This makes it possible to acquire the teaching data which contain variation in the feature value space. The feature values derived from the inspection executed multiple times are averaged for each coordinate so that variation in the teaching data generated in the normal operation inspection may be suppressed. Execution of the deviation-containing learning or labeling adapted to allocation allows training of the learning device employed in the normal operation state using the teaching data based on secure classification results derived from the high accuracy inspection.

LIST OF REFERENCE SIGNS 10 inspection apparatus,
101 wafer,
102 chuck,
103 rotation stage,
104 direct advancing stage,
105 light source,
106 illumination optical system,
107 A/D converter section,
108 control section,
109 operation system,
110 signal processing section,
111 comparative computing section,
112 external input section,
113 data processing section,
114 display section

The invention claimed is:

1. A defect inspection method for inspecting a defect on a sample based on output information of multiple detectors, each of which is configured to detect a scattered light generated by irradiation of the sample with a light, using one or more computers, the defect inspection method comprising the steps of:
receiving outputs of multiple detectors arranged at multiple elevation angles to a surface of the sample, and in multiple azimuths to an irradiation point of the light on the sample in a direction to the surface of the sample; and
inputting output information of the multiple detectors to a data processing section, by which a learning device is executed, and the learning device is trained using the output information of the multiple detectors and defect information, and outputting the defect information;
wherein when the same sample is inspected multiple times, the one or more computers applies a label indicating a defect of interest to the output information having a defect detection capture rate equal to or larger than a predetermined value, and applies a label indicating a nuisance to the output information having the capture rate smaller than the predetermined value.

2. A system including an inspection tool which includes multiple detectors for detecting a scattered light generated by irradiation of a sample with a light, the multiple detectors being arranged at multiple elevation angles to a surface of the sample, and in multiple azimuths to an irradiation point of the light on the sample in a direction to the surface of the sample, the system including a computer allowed to execute a program stored in a computer-readable storage medium for processing output information of the multiple detectors, wherein the computer receives output information of the multiple detectors, and inputs output information of the multiple detectors to a data processing section, by which a learning device is executed, and the learning device is trained using output information of the multiple detectors and defect information for outputting the defect information;
wherein when the same sample is inspected multiple times, the computer applies a label indicating a defect of interest to the output information having a defect detection capture rate equal to or larger than a predetermined value, and applies a label indicating a nuisance to the output information having the capture rate smaller than the predetermined value.

3. The system according to claim 2, wherein the learning device is trained using teaching data in which a noise is labeled as a nuisance.

4. The system according to claim 2, wherein the learning device is trained to set a coordinate on which the output information is acquired, and information of a predetermined peripheral region of the coordinate as teaching data.

5. The system according to claim 2, wherein the learning device is trained using teaching data in which a first labeling using the defect information, which is inputted into the learning device, is applied to output information of the multiple detectors, the input information being derived from a scattered light simulation based on inputs of the defect information and inspection information.

6. The system according to claim 5, wherein the computer compares output information of the multiple detectors, to which the first labeling has been applied with output information of the multiple detectors, which has been derived from actual irradiation of the sample with a light, based on which a second labeling is applied to output information of the multiple detectors, which has been derived from the actual irradiation of the sample with the light.

7. A non-transitory computer-readable medium configured to store an instruction of a program executable by a computer for processing output information of multiple detectors, each of which is configured to detect a scattered light generated by irradiation of a sample with a light, wherein the non-transitory computer-readable medium receives outputs of multiple detectors arranged at multiple elevation angles to a surface of the sample, and in multiple azimuths to an irradiation point of the light on the sample in a direction to the surface of the sample, and inputs output information of the multiple detectors to a data processing section, by which a learning device is executed, and the learning device is trained using output information of the multiple detectors and defect information for outputting the defect information;
wherein when the same sample is inspected multiple times, the computer applies a label indicating a defect of interest to the output information having a defect detection capture rate equal to or larger than a predetermined value, and applies a label indicating a nuisance to the output information having the capture rate smaller than the predetermined value.

* * * * *